United States Patent

Hashimoto et al.

[11] Patent Number: 5,866,887
[45] Date of Patent: Feb. 2, 1999

[54] APPARATUS FOR DETECTING THE NUMBER OF PASSERS

[75] Inventors: Kazuhiko Hashimoto, Moriguchi; Nobuyuki Yoshiike, Ikoma; Katsuya Morinaka, Toyonaka, all of Japan

[73] Assignee: Matsushita Electric Industrial Co., Ltd., Osaka-fu, Japan

[21] Appl. No.: 922,600

[22] Filed: Sep. 3, 1997

[30] Foreign Application Priority Data

Sep. 4, 1996 [JP] Japan .................................. 8-233970

[51] Int. Cl.⁶ .................................. B61L 1/16; G06M 7/00
[52] U.S. Cl. .......................... 235/98 R; 235/98 C; 377/6; 250/221
[58] Field of Search .................. 377/6; 235/98 R, 235/98 C; 250/221

[56] References Cited

U.S. PATENT DOCUMENTS

| | | | |
|---|---|---|---|
| 3,141,612 | 7/1964 | Bolton | 235/98 R |
| 4,000,400 | 12/1976 | Elder | 235/92 |
| 4,009,389 | 2/1977 | Lindholm | 250/221 |
| 4,278,878 | 7/1981 | Kato | 235/92 |
| 4,356,387 | 10/1982 | Tsubota et al. | 235/92 |
| 4,528,679 | 7/1985 | Shahbaz et al. | 377/6 |
| 4,745,284 | 5/1988 | Masuda et al. | 250/338.3 |
| 4,799,243 | 1/1989 | Zepke | 377/6 |
| 4,847,485 | 7/1989 | Koelsch | 250/221 |
| 5,255,301 | 10/1993 | Nakumura et al. | 377/6 |
| 5,305,390 | 4/1994 | Frey et al. | 382/2 |

FOREIGN PATENT DOCUMENTS

| | | |
|---|---|---|
| 3-186998 | 8/1991 | Japan . |
| 3-196286 | 8/1991 | Japan . |
| 3-201179 | 9/1991 | Japan . |
| 4-95794 | 3/1992 | Japan . |
| 5-81503 | 4/1993 | Japan . |
| 5-324955 | 8/1993 | Japan . |

*Primary Examiner*—Anita Pellman Gross
*Assistant Examiner*—Daniel St. Cyr
*Attorney, Agent, or Firm*—Wenderoth, Lind & Ponack, L.L.P.

[57] ABSTRACT

A plurality of rows are provided on a calling of sensors and each have a plurality of distance variation measuring sensors. The distance variation measuring sensors each include a light emitter and a light receiver arranged in the orthogonal direction to the direction in which human bodies pass. The number of passers is detected on the basis of the number of the distance variation measuring sensors which have detected a human body. The traveling direction of human bodies is detected on the basis of the change in the distance to the distance variation measuring human bodies measured by the sensors.

27 Claims, 33 Drawing Sheets

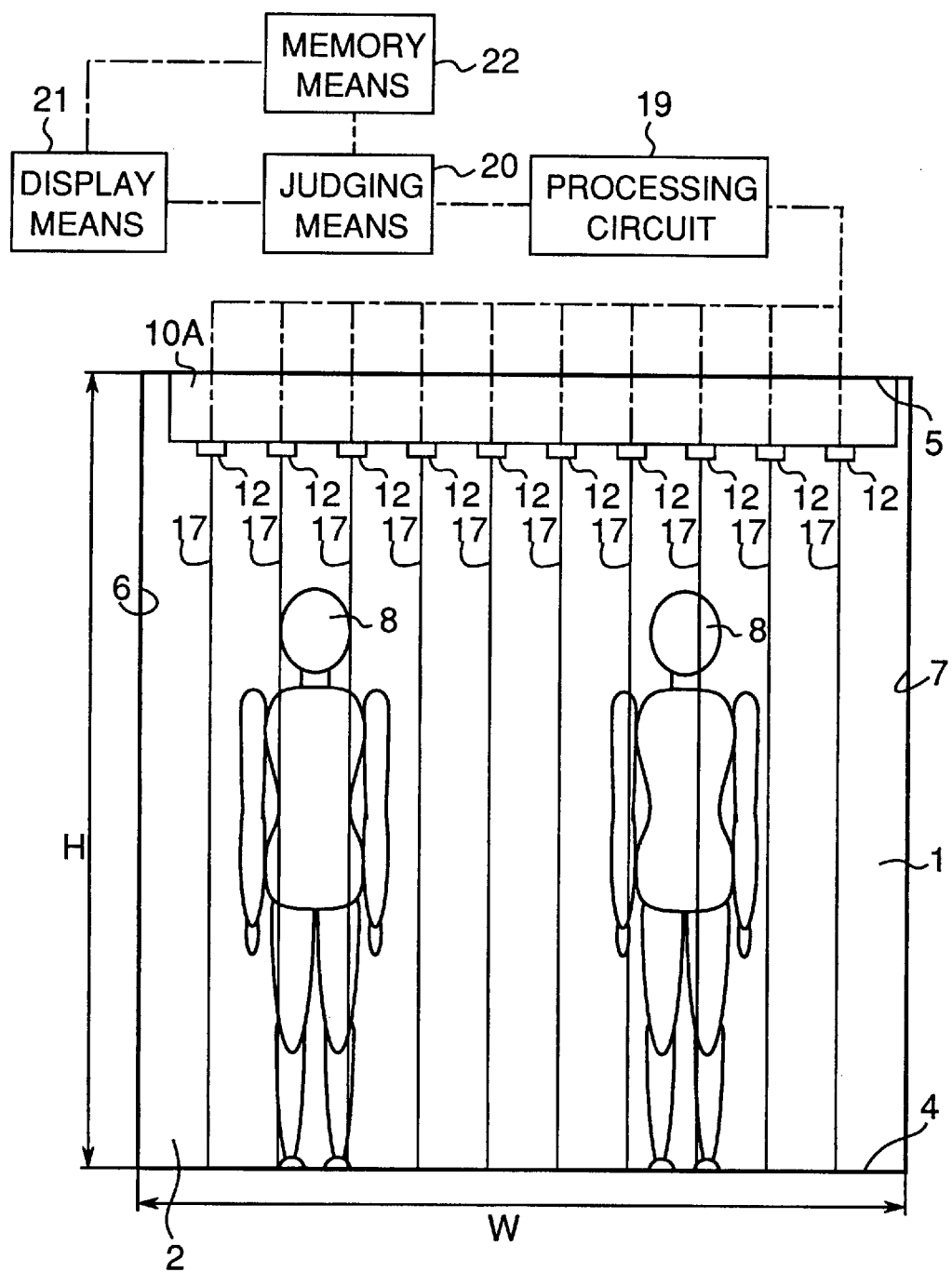

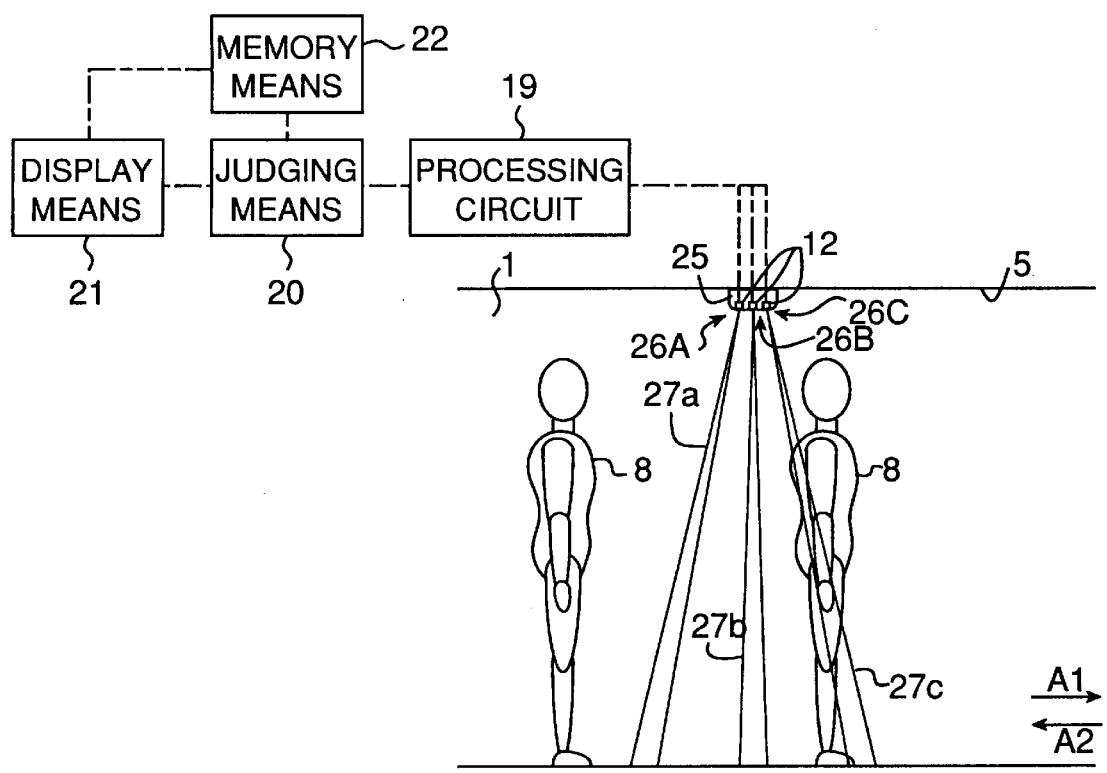

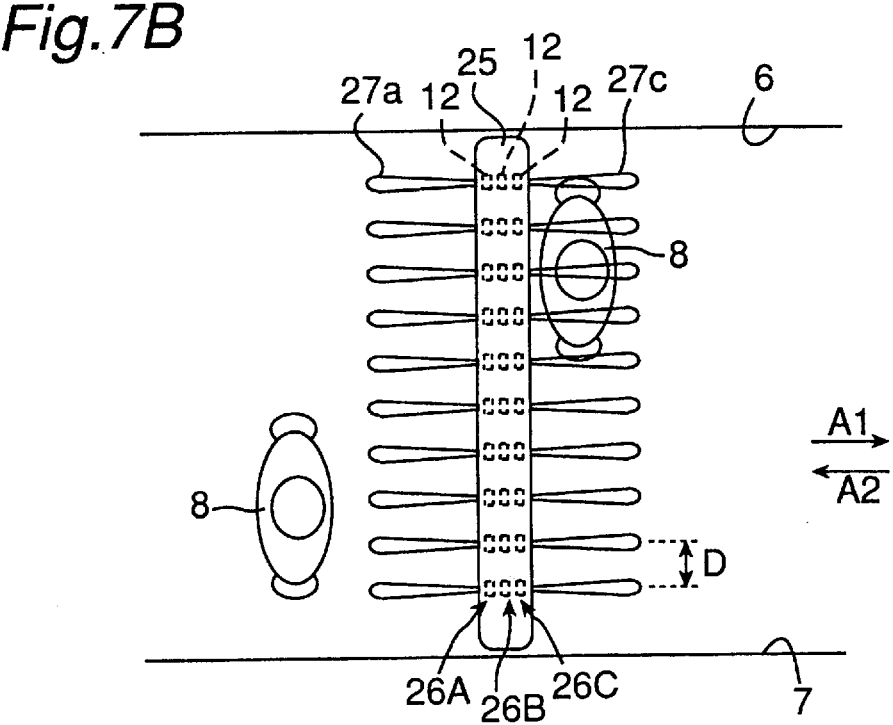

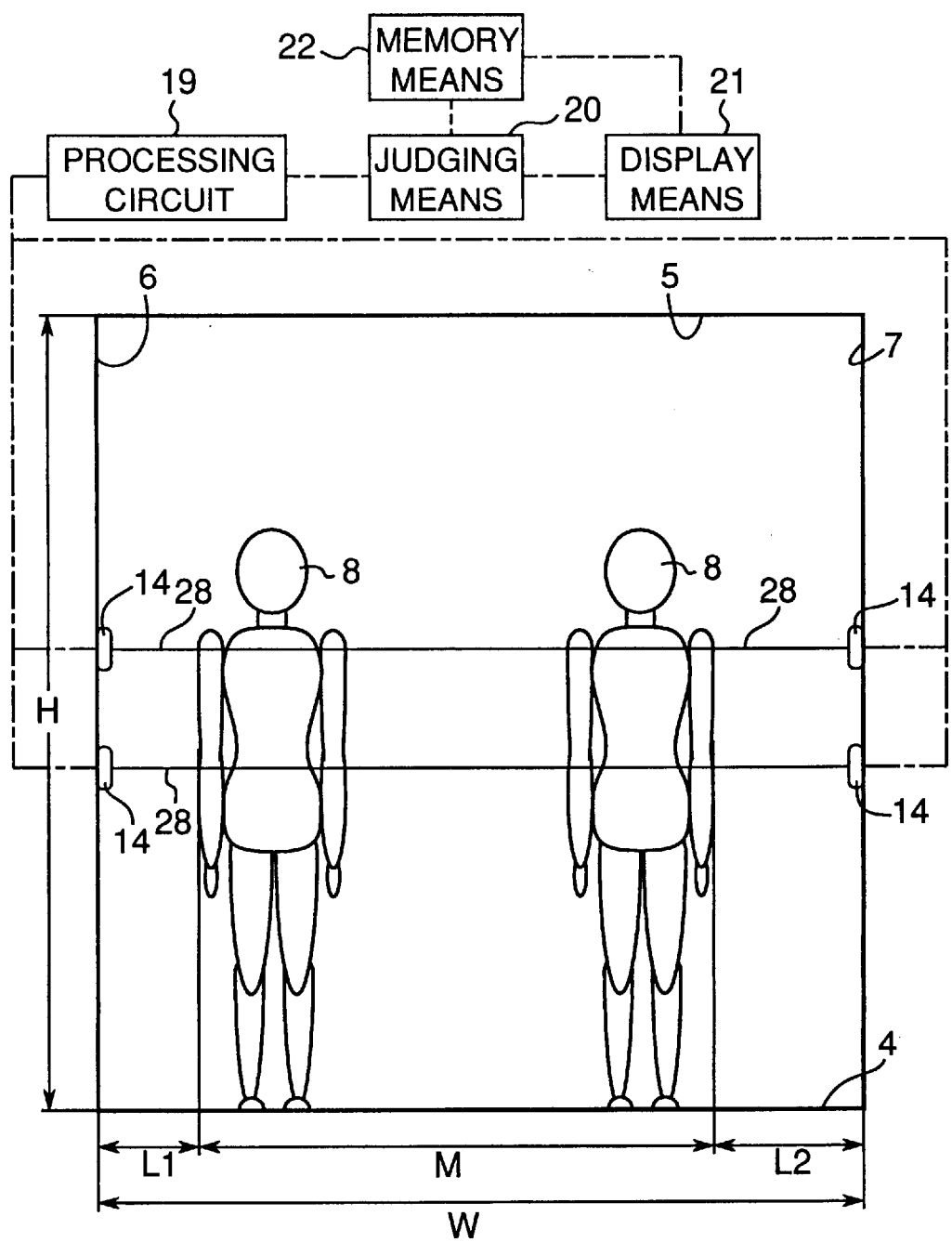

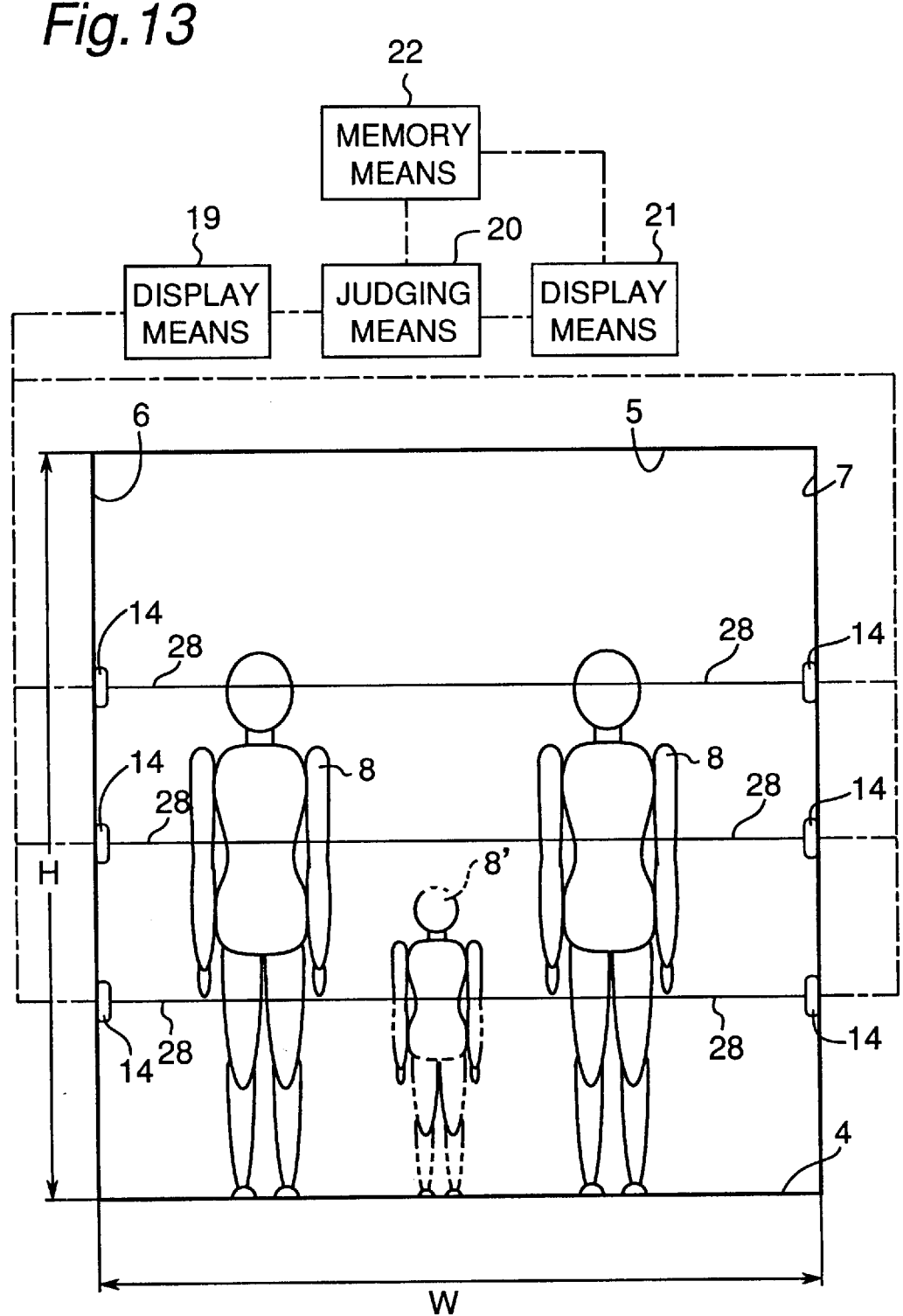

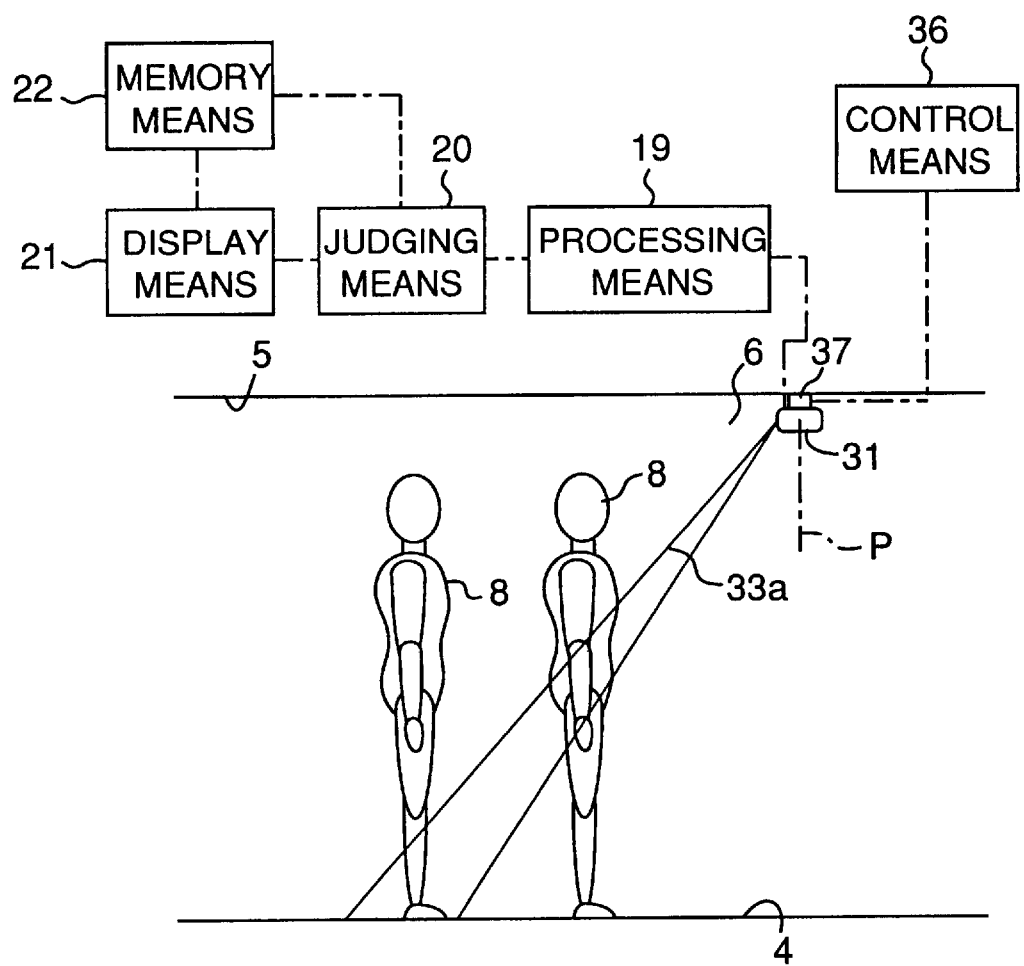

APPARATUS FOR DETECTING THE NUMBER OF PASSERS

BACKGROUND OF THE INVENTION

1. Field of the Invention

The present invention relates to an apparatus for detecting the number of passers which detects the number and passing directions of human bodies that have passed a doorway or the like of a vehicle such as a train, a building such as exhibition hall, a movie theater and a store, or a room.

2. Description of the Prior Art

In recent years, for the purpose of controlling environment control equipment such as an air conditioner and a lighting fixture, or for controlling a crime prevention system, and the like purpose, the need has been increasing for monitoring the status of the persons being in a room and measuring the temperature distribution in the room for the detection of the presence and the quantity of activity of the persons in the room. Corporations and the like also have a need for monitoring the number of the persons who have entered or left a room or building.

Such methods of monitoring include: a method of requesting an entry of name and the like at a reception desk for a building or room; a method of counting the persons who have entered or left a room or the like with a manual counter at the doorway; and a method of counting the persons who have entered or left a room or the like by providing a gate or the like which is opened and closed mechanically and by letting only one person at a time enter or leave the room or the like.

Counting passers by manual count, however, causes much trouble and much cost. The method of mechanically counting passers entails much cost because of the necessity of providing large-scale facilities and, in some cases, the space for the facilities cannot be obtained.

On the other hand, a method has been proposed in which passers are counted by the detection with sensors or the like of the human bodies passing a specific area to be monitored, such as a doorway of a building or the like.

For example, there is a method of detecting one or more moving human bodies by providing a television camera above an area to be monitored and by processing in real time the pictures taken by the camera.

There are also known a method of detecting the passage of human body by optical sensing means such as photoelectric switch utilizing a light beam, a method of detecting the passage of a human body by infrared sensors which detect infrared radiation emitted by the human body, and the like.

For example, in Japanese Laid-Open Patent Publication No. 3-201179 is disclosed an apparatus in which a plurality of optical sensors are arranged in two rows crossing a passage. The 3-201179 application discloses a method of counting passers on the basis of the number of the optical sensors which have detected a human body, and a method of detecting the traveling direction of one or more human bodies on the basis of the chronological order of ON/OFF switching of the sensors forming each row.

In Japanese Laid-Open Patent Publication No. 3-186998 a method of counting passers on the basis of the detection pattern of a plurality of infrared sensors arranged in a row crossing a passage is disclosed.

In Japanese Laid-Open Patent Publications No. 4-95794 and No. 5-81503 are disclosed methods of detecting the traveling direction of one or more human bodies on the basis of a chronological order and pattern of detection by a plurality of infrared sensors arranged in a row extending along a passage.

Additionally, in Japanese Laid-Open Patent Publications No. 3-196286, No. 5-324955, and so on are disclosed methods of detecting the number and traveling directions of passers via the detection of the weight of one or more human bodies with so-called "mat sensor". The mat sensor has a matrix of pressure sensors such as pressure-sensitive conductive element which have been incorporated into a floor mat provided on a doorway, stairs, or the like.

The above conventional methods of detecting the number and traveling directions of passers, however, have their respective drawbacks as follows.

In the method using a television camera, it is necessary to use a complex technique in which the pattern recognition of the images is performed of one or more human bodies from the pictures taken, and the facilities for the method are therefore expensive.

In the case that the optical sensing means are provided on both sides of a passage, it is difficult to determine the number of passers when a plurality of persons pass while forming a line extending in the direction of the width of the passage. Also, in this case, the difference in the light sensitivities of the light receivers may cause interference between adjoining optical sensors. In contrast to that, the method disclosed in aforementioned Japanese Laid-Open Patent Publication No. 3-201179 employs two types of optical sensors using different frequencies. In this case, however, there is a problem that it is difficult to adjust each optical sensor.

The method using the optical sensing means also has a problem that a large traveling speed of a human body results in a low accuracy of detecting the traveling direction. For example, the optical sensor disclosed in aforementioned Japanese Laid-Open Patent Publication No. 3-201179 is simply turned off when the output of the light receiver is below a predetermined level which indicates absence of human body, while it is turned on when the output is above the predetermined level which indicates presence of human body. Accordingly, a large traveling speed of a human body sometimes makes it impossible to determine which row of sensors of the two rows has been turned on or off earlier.

In the methods using the infrared sensors disclosed in aforementioned Japanese Laid-Open Patent Publications No. 3-186998, No. 4-95794 and No. 5-81503, misdetection or misjudgment often occurs in the cases of continuous passage of human bodies across an area to be monitored, crossing of passing human bodies, and passage of a plurality of human bodies moving abreast, or the like. As a result, passers cannot be accurately counted.

The methods using the mat sensor, disclosed in aforementioned Japanese Laid-Open Patent Publications No. 3-196286, No. 5-324955, and so on, have a durability problem because passage of human bodies is detected with the mechanical switching of the pressure-sensitive conductive elements.

SUMMARY OF THE INVENTION

The invention has been made in consideration of the above-mentioned problems of the prior arts, and it is an object of the invention to achieve the detection of the number of passers with a high accuracy and a high degree of reliability, with a simple arrangement and at a low cost.

In order to resolve the above-mentioned problems, the first aspect of the invention provides an apparatus for detecting the number of human bodies passing a specific area to be monitored. The apparatus comprises a plurality of distance variation measuring sensors provided on a ceiling of the area to be monitored. Each sensor has a light emitter and a light receiver and each sensor is capable of measuring a rate of change relative to time in distance to the human bodies. The rows of sensors are arranged in an orthogonal direction to a direction in which the human bodies pass and are spaced apart in the direction in which the human bodies pass. A detection area of each sensor is defined so as to extend from the ceiling to a floor in the area to be monitored. The focus of each sensor is set at a height corresponding to a height of the shoulders to head of an adult person. The number of passing human bodies is detected on the basis of the number of the sensors which have detected the human body in each row of sensors. The traveling direction of the human bodies is detected by the comparison between a rate of change relative to time in the distance to the human bodies measured by a sensor included in a row of sensors and a rate of change relative to time in the distance to the human bodies measured by a sensor included in another row of sensors.

In accordance with the apparatus for detecting the number of passers having such an arrangement, the number of passers is detected on the basis of the number of the sensors for measuring variation in distance which have detected a human body. And the traveling direction of one or more human bodies is detected on the basis of rates of change relative to time in the distances to the human bodies measured by sensors for measuring variation in distance. As a result, the number and traveling directions of passers can be detected with a high accuracy and with a high degree of reliability. The intervals between the sensors for measuring variation in distance which constitute each of the rows of sensors are preferably not less than 20 cm and not more than 40 cm.

With the intervals between the sensors for measuring variation in distance set at not less than 20 cm, the light emitted by the light emitter of a distance variation measuring sensor and then reflected by a human body can be prevented from being incident on the light receivers of the adjoining sensors for measuring variation in distance. With the intervals between the sensors for measuring variation in distance set at not more than 40 cm, on the other hand, a human body is not allowed to pass through the spaces between the detection areas without being detected, because the width of the shoulders of an adult person is on the order of 40 to 50 cm.

The angles which the detection areas of the distance variation measuring sensor form with the vertical direction are preferably made different for each row of sensors. With the angles which the detection areas form with the vertical direction made different for each row of sensors, the change in the distance to the human bodies measured by the sensors for measuring variation in distance can be detected with a higher accuracy. As a result, the number and traveling directions of passers can be detected with a higher accuracy and with an improved reliability.

The sensors for measuring variation in distance which constitute the plurality of rows of sensors are preferably mounted to one base body. With such an arrangement, the apparatus can be made small in size.

The second aspect of the invention provides an apparatus for detecting the number of human bodies passing a specific area to be monitored in which the apparatus comprises a plurality pairs of distance measuring sensors provided on the both side walls of the area to be monitored. Each pair of distance measuring sensors are provided so as to be opposed to each other. Each distance measuring sensor has a light emitter and a light receiver and is capable of measuring the distance to the human bodies. The pairs of distance measuring sensors form a plurality of lines spaced apart vertically and a plurality of lines spaced apart in a direction in which the human bodies pass. The number of passing human bodies is detected on the basis of the distances to the human bodies measured by the distance measuring sensors. The traveling direction of the human bodies is detected on the basis of a chronological order of the detection of the human bodies by the distance measuring sensors.

In accordance with the apparatus for detecting the number of passers having such an arrangement, the number of passers is detected on the basis of the distances to human bodies measured by the distance measuring sensors. Also the traveling direction of one or more human bodies is detected on the basis of the chronological order of the detection of the human bodies by the distance measuring sensors. As a result, the number and traveling directions of passers can be detected with a high accuracy and with a high degree of reliability.

The third aspect of the invention provides an apparatus for detecting the number of human bodies passing a specific area to be monitored. The apparatus includes a plurality of distance measuring sensors. Each distance measuring sensor has a light emitter and a light receiver and is capable of measuring the distance to the human bodies. Each distance measuring sensor is mounted to one given location on a ceiling of the area to be monitored so that the detection area of the distance measuring sensor extends at a downward angle with respect to the horizontal direction. The detection areas of the distance measuring sensors are oriented at a different angle than each other with a direction in which respect to the human bodies pass so that the plurality of detection areas represent an sector spread along a orthogonal direction with respect to the direction in which the human bodies pass. The number of passing human bodies is thereby detected on the basis of the number of the distance measuring sensors which have detected a human body. The traveling direction of the human bodies is thereby detected on the basis of the distance to the human bodies measured by the distance measuring sensors.

In accordance with the apparatus for detecting the number of passers having such an arrangement, the number of passers is detected on the basis of the number of the distance measuring sensors which have detected a human body. Also the traveling direction of one or more human bodies is detected on the basis of the change relative to time in the distance to the human bodies measured by the distance measuring sensors. As a result, the number and traveling directions of passers can be detected with a high accuracy and with a high degree of reliability.

In this case also, with the arrangement in which the plurality of distance measuring sensors are mounted together to one base body, the apparatus can be made small in size and can be simplified.

There also may be provided driving means which rotates the base body reciprocately and continuously about a vertical axis. With such driving means provided, the plurality of detection areas which represents a sector can rotate reciprocately continuously in the orthogonal directions with respect to the directions in which the human bodies pass. As a result, the whole part of the area to be monitored extending in the orthogonal directions to the directions in which the human bodies pass can be monitored even in the case that the overall area where the detection areas are simultaneously defined is relatively narrow.

The width of the detection area of each distance measuring sensor at a height corresponding to the height of the shoulders to head of an adult person is preferably not more than 40 cm. With the width of the detection area of the distance measuring sensor set as mentioned above, each distance measuring sensor is capable of detecting one human body reliably, while one distance measuring sensor can be prevented from detecting two human bodies simultaneously.

In addition, the apparatus preferably further includes means for judging that one or more human bodies have passed when two or more distance measuring sensors have detected any human bodies. In this case, the detection of one or more human bodies can be done with a higher accuracy.

The plurality of sensors for measuring variation in distance or the plurality of distance measuring sensors may be actuated sequentially in a predetermined order and at predetermined time intervals. In this case, the ray emitted from the light emitter of a distance variation measuring sensor or distance measuring sensor and then reflected by a human body is prevented from being incident on the light receivers of the adjoining sensors for measuring variation in distance or the like without being incident on the light receiver of the original distance variation measuring sensor or the like.

The fourth aspect of the invention provides an apparatus for detecting the number of human bodies passing a specific area to be monitored. The apparatus comprises a plurality of infrared sensors each having a plurality of elements for detecting infrared radiation and a pair of distance measuring sensors which have a light emitter and a light receiver and which are capable of measuring the distance to the human bodies. The infrared sensors are mounted to a ceiling of the area to be monitored and are disposed along an orthogonal direction with respect to a traveling direction of the human bodies. Each infrared sensor is mounted so that the elements are disposed along the traveling direction of the human bodies. The pair of distance measuring sensors are mounted to both sides walls of the area to be monitored, so as to be opposed to each other. The number of passing human bodies is thereby detected on the basis of the distances to the human bodies measured by the distance measuring sensors. The traveling direction of the human bodies is thereby detected on the basis of a chronological order of the detection of the human bodies by the elements in each infrared sensor.

In accordance with the apparatus for detecting the number of passers having such an arrangement, the number of passers is detected on the basis of the distances to human bodies measured by the distance measuring sensors and the traveling direction of one or more human bodies is detected on the basis of the change in the outputs of the plurality of devices provided in the infrared sensors. As a result, the number and traveling directions of passers can be detected with a high accuracy and with a high degree of reliability.

The width of the detection area of each infrared sensor and the spacing between the detection areas at a height corresponding to the height of the shoulders to head of an adult person are preferably not more than 40 cm. With the width of the detection areas set in the above range, each infrared sensor is capable of detecting one human body reliably, while one infrared sensor can be prevented from detecting two human bodies simultaneously. With the width of the detection areas set in the above range, additionally, a human body is not allowed to pass through the spaces between the detection areas without being detected, so that the passage of one or more human bodies is reliably detected.

Preferably, the apparatus further includes means for calculating a reference value by averaging the outputs of the infrared sensors in the state without human body and upper and lower threshold values deviating from the reference value by a predetermined value. The apparatus also includes means for judging that one or more human bodies have been detected when the outputs of one or more of the devices in each infrared sensor are not lower than the upper threshold value or not higher than the lower threshold value. With the reference values for the judgment on the detection of human body ranging over a width, misdetection of human body is prevented and the traveling directions of human bodies can be detected with a higher accuracy.

The means for judging, preferably, holds the reference value and the upper and lower threshold values when one or more human bodies are detected, and updates the reference value and the upper and lower threshold values when no human bodies are detected. When the reference value and the upper and lower threshold values are updated in the case that one or more human bodies are detected, the accuracy of detecting human bodies decreases because the temperatures of a human body and of the background are different in general. Accordingly, the decrease in the accuracy of detecting human bodies can be prevented by maintaining the reference value and the like without updating them while the detection of one or more human bodies is affirmed.

The traveling direction of one or more human bodies is preferably detected in the case that three devices have consecutively detected any human bodies.

BRIEF DESCRIPTION OF THE DRAWINGS

These and other objects and features of the present invention will become clear from the following description taken in conjunction with the preferred embodiment thereof with referee accompanying drawings throughout which like parts are designated by like reference numerals, and in which:

FIG. 1 is a schematic elevation view illustrating an apparatus for detecting the number of passers of a first embodiment;

FIG. 7A is a schematic side view illustrating an apparatus for detecting the number of passers of a second embodiment;

FIG. 7B is a schematic plan view illustrating the apparatus for detecting the number of passers of the second embodiment;

FIG. 8 is a schematic elevation view illustrating an apparatus for detecting the number of passers of a third embodiment;

FIG. 13 is a schematic elevation view illustrating an apparatus for detecting the number of passers of a fourth embodiment;

FIG. 19A is a schematic side view illustrating a seventh embodiment

DETAILED DESCRIPTION OF THE PREFERRED EMBODIMENT

Hereinafter, some embodiments of the invention, will be described referring to the appended drawings.

First Embodiment

Figure 2A:
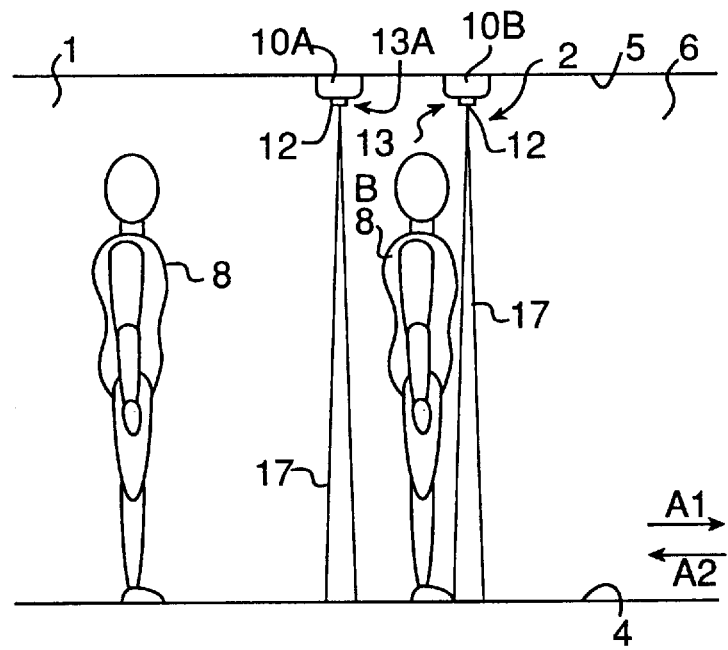
FIG. 2A is a schematic side view of the apparatus of FIG. 1.
Figure 2B:
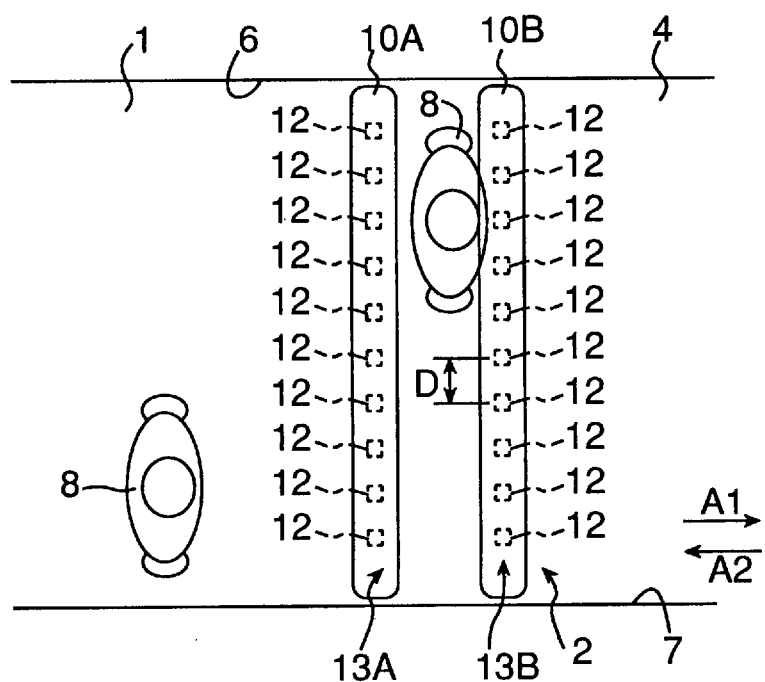
FIG. 2B is a schematic plan view of the apparatus of FIG. 1.
Figure 3:
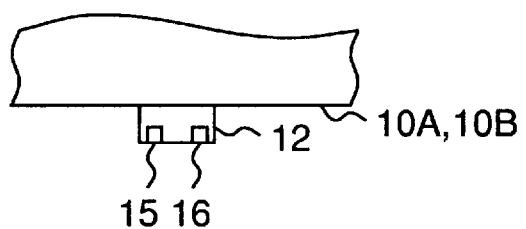
FIG. 3 is a schematic representation illustrating a sensor for measuring variation of distance.

FIGS. 1 to 3 illustrate a first embodiment of the invention.

An apparatus for detecting the number of passers in accordance with the first embodiment detects the number and traveling directions of human bodies 8 passing a specific area 2 to be monitored in a passage 1 such as an area in the vicinity of a doorway. The width W of the passage 1 is 210 cm, and the height H from a floor 4 up to a ceiling 5 is 220 cm. With regard to the traveling directions of human bodies 8, the direction designated by an arrow A1 in FIG. 2 will be assumed to be the entering direction, and the direction designated by an arrow A2 will be assumed to be the leaving direction.

Two long rectangular base bodies 10A, 10B extending in a direction generally orthogonal to the directions in which human bodies 8 pass (i.e., in the direction of the width of the passage 1) are mounted to the ceiling 5 of the passage 1. The base bodies 10A, 10B are parallel to each other and spaced apart at a given interval in the traveling directions of human bodies 8 (i.e., in the direction in which the passage 1 extends). Ten distance variation measuring sensors 12 are mounted to the bottom surface of each of the base bodies 10A, 10B at uniform intervals along the direction of the width of the passage 1. Hereinafter, the distance variation measuring sensors 12 which are mounted to the base body 10A will be referred to as a first row 13A of sensors, while the distance variation measuring sensors 12 which are mounted to the base body 10B will be referred to as a second row 13B of sensors.

As shown in FIG. 3, each sensor 12 includes a light emitter 15 for emitting or near-infrared ray and a light receiver 16 for receiving the near-infrared ray which has been reflected by a human body 8. Each sensor 12 is connected to display means 21 via a signal processing circuit 19 and via judging means 20. The signal processing circuit 19 converts the output signals of the light receiver 16, from analogue signals into digital signals. The judging means 20 calculates a rate of change relative to time in the distance from the sensor to a human body 8, from the digital signals. The judging means 20 also decides the number, traveling directions and the like of passers on the basis of the rate. The display means 21 displays the calculation results given by the judging means 20. Memory means 22 is connected to the judging means 20 and to the display means 21. The light beam emitted by the light emitter 15 is not limited to near-infrared ray, but may be of a different frequency region.

Each sensor 12 is mounted to the base body 10A or 10B so that a detection area 17 is defined from the ceiling 5 toward the floor 4. In the detection area 17, the near-infrared ray emitted by the light emitter 15 and then reflected by a human body is incident on the light receiver 16. As the result, the passage of a human body 8 can be detected. The detection sensitivity of each sensor 12, i.e., the focus of each sensor is set so that the shoulders to head of an adult person standing right under the sensor 12 can be detected.

The interval D between adjoining sensors 12 which are included in the same row 13A, 13B of sensors is set at 20 cm. However, the interval D is not limited to 20 cm but may be set within the range not less than 20 cm and not more than 40 cm. The interval D is set not less than 20 cm so that the near-infrared ray emitted from the light emitter 15 of a sensor 12 and then reflected by a human body 8 is prevented from being incident on the light receivers 16 of the sensors 12 adjoining the original sensor 12 along the direction of the width of the passage without being incident on the light receiver 16 of the original sensor 12. The interval D is set to be not more than 40 cm because setting the interval D to be larger than 40 cm may allow a human body 8 to pass through a space between adjoining detection areas 17 without being detected, because the breadth of the shoulders of an adult person is typically on the order of 40 to 50 cm.

Figure 4:
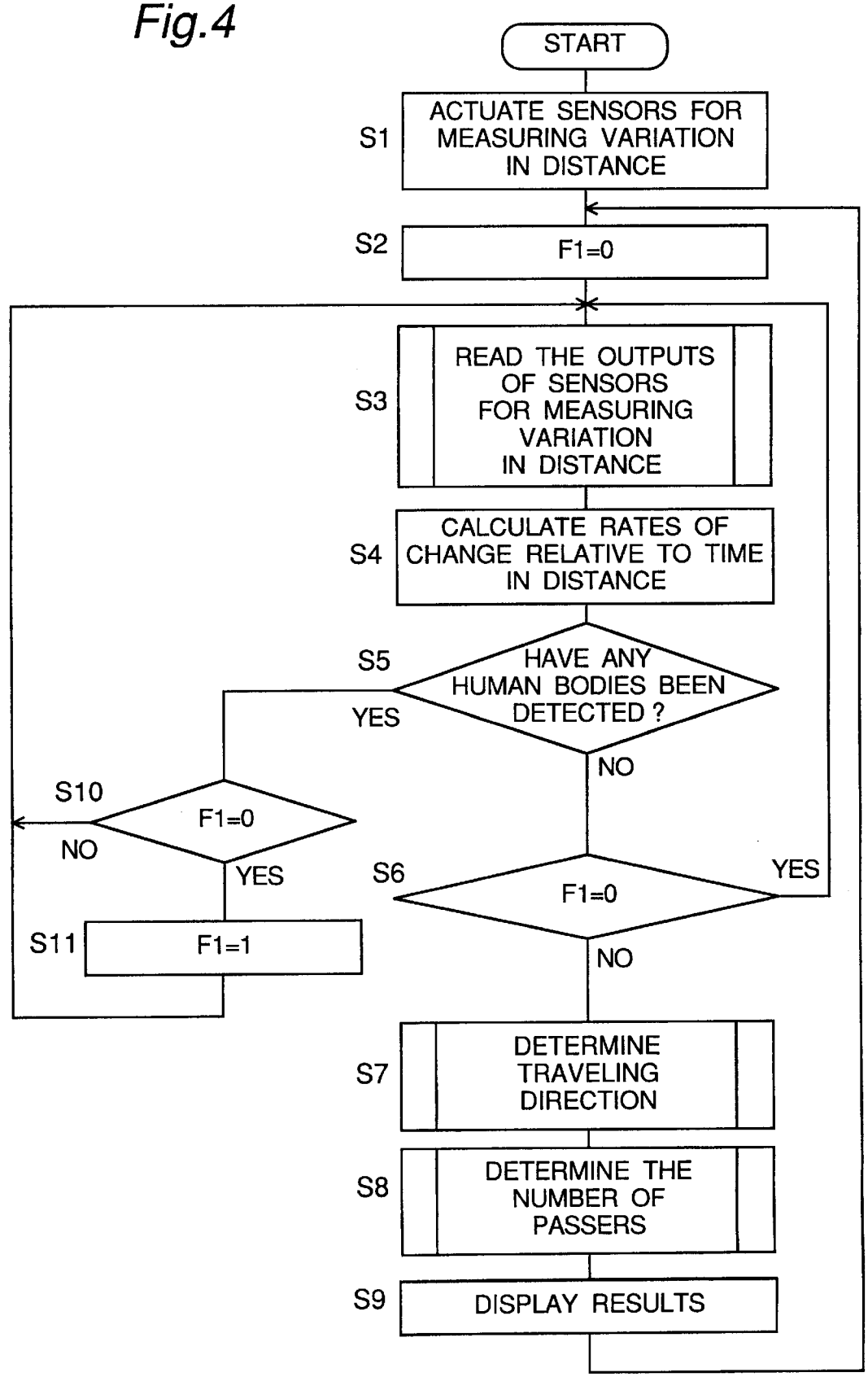
FIG. 4 is a flow chart for explaining the operation of the first embodiment.

Referring to FIG. 4, the operation of the first embodiment will be described.

In a step S1, each distance variation measuring sensor 12 is actuated. In a step S2, a flag F1 is set to an initial value of "0."

Figure 5:
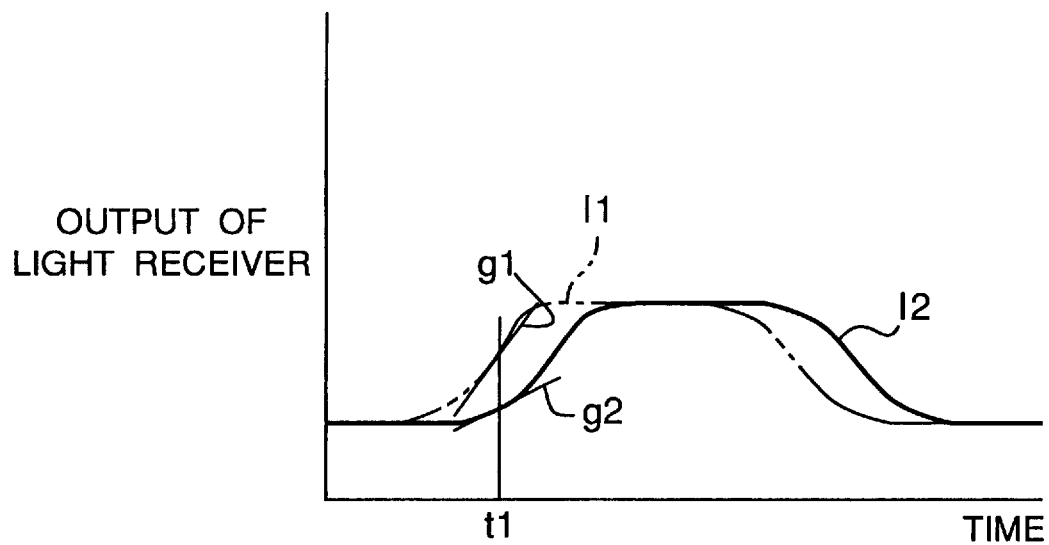
FIG. 5 is a diagram illustrating a change in the outputs of the light receiver of a sensor for measuring variation of distance.

In a step S3, the output signals from each sensor 12 are read into the signal processing circuit 19. In a step S4, a rate of change relative to time in the distance is calculated and stored in the memory means 22. As shown in FIG. 5, a rate of change relative to time in the distance is a gradient of curves 11, 12 plotted with the outputs of the light receiver 16 as the ordinate and with time as the abscissa. The curve 11 shows outputs of a sensor 12 in the first row 13A of sensors, and the curve 12 shows outputs of the sensor in the second row 13B of which the position in the width of the passage corresponds to that of the sensor 12 in the row 13A. For example, the rates of change relative to time in the distance at time t1 are obtained as the gradients of tangents g1, g2 passing through points on the curves 11, 12.

In a step S7, the traveling direction of the human body is determined.

More specifically, in the case that the rate of change in the distance relative to time is above a predetermined value, it is judged that one or more human bodies have been detected. On the other hand, in the case that the rate of change in the distance relative to time is below the predetermined value, it is judged that no human bodies have been detected. The memory means 22 stores the information on the identification of the sensors 12 which have detected a human body and on the point in time when the detection has been done.

When the detection of one or more human bodies is not detected in the step S5, a step 6 is executed. In the step S6, whether the flag F1 is "0" or not is judged. As mentioned above, the flag F1 was at the initial value "0" when the apparatus was actuated; the operation therefore goes back from the step S6 to the step S3. After that, the processes from the step S3 to the step S6 are repeated until a human body or bodies 8 are detected.

When the detection of one or more human bodies is detected in the step S5, a step S10 is executed. In the step S10, whether the flag F1 is "0" or not is judged. In the case that any human bodies 8 have been detected for the first time in this cycle, a step S11 is executed because the flag F1 is at the initial value "0" as mentioned above. After the flag F1 is set at "1" in the step S11, the operation goes back to the step S3. After that, the processes of the steps S3, S4, S5, and S10 are repeated as long as the human bodies are detected in the step S5.

When the human bodies 8 have completely passed, it is judged in the step S5 that no human bodies are detected, and the step S6 is executed. When the human bodies have passed, the flag F1 has already set at "1". Thus the operation goes from step S6 to the step S7.

In the step S7, the traveling direction of the human bodies is decided on the basis of the rate of change in the distance relative to time calculated in the step S4.

At the point t1 in time in FIG. 5, the beginning of the increase in the outputs of the light receiver 16, which outputs had been generally constant, indicates that one or more human bodies 8 have been passing through. Besides, the rate of change relative to time in the outputs of a sensor 12 in the first row 13A of sensors, which rate is represented by the tangent g1, is larger than the rate of a sensor 12 in the second row 13B of sensors, which rate is represented by the tangent g2. This indicates that the sensor 12 in the first row 13A of sensors has detected the human body earlier than the sensor 12 in the second row 13B. In the case of FIG. 5, it is therefore judged that the human body 8 has moved in the entering direction designated by the arrow A1.

Figure 6:
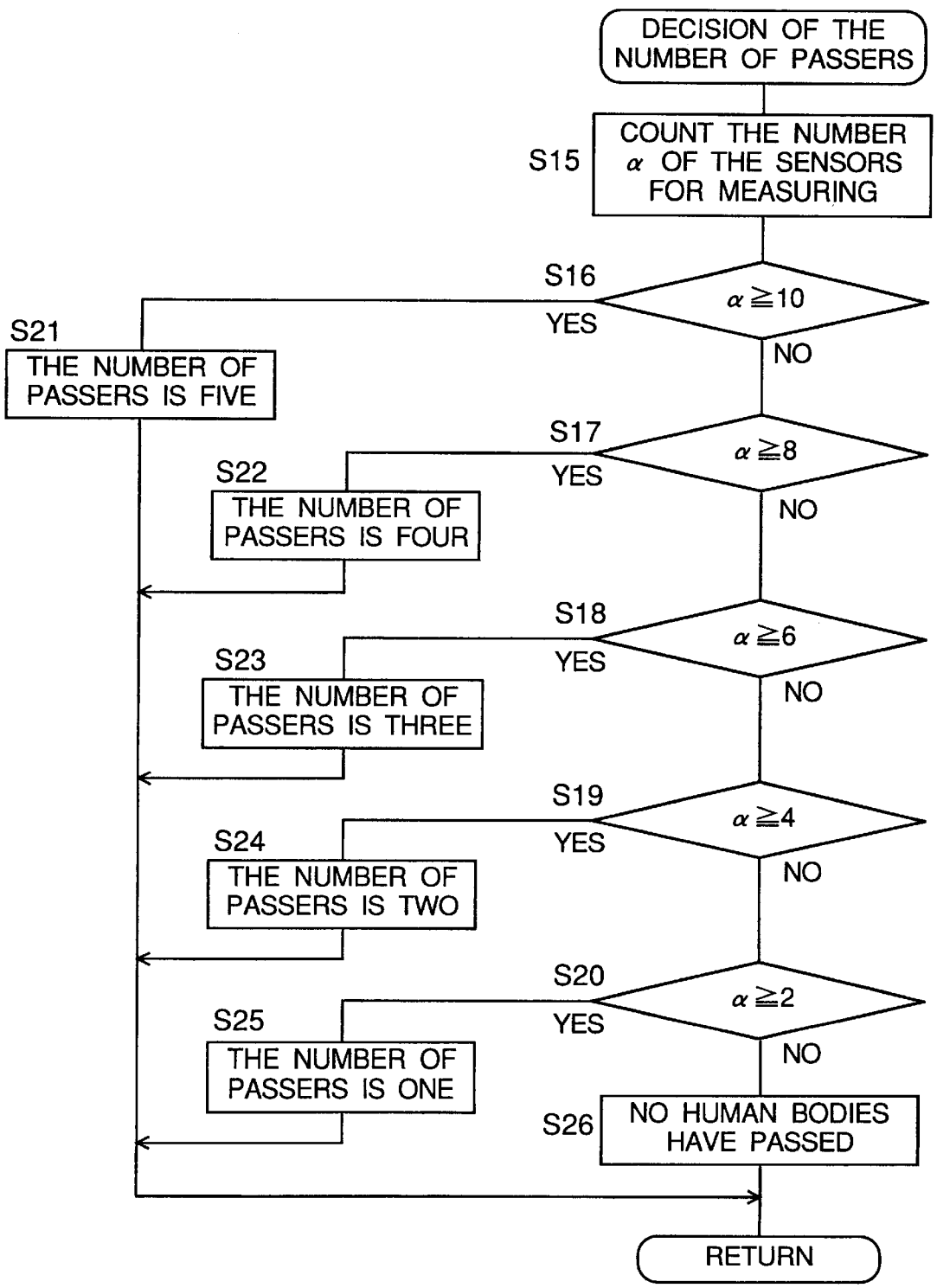
FIG. 6 is a flow chart illustrating the processes in a step S8 of FIG. 4.

In a step S8, the number of passers is decided. More specifically, the processes shown in FIG. 6 are executed on each of the rows 13A, 13B of sensors. In a step S15, out of ten sensors 12 the number α of the sensors 12 which have detected the passage of a human body are counted in each row 13A, 13B of sensors. When the number α is judged to be not less than ten in a step S16, the number of passers is determined as five in a step S21; when α is judged to be less than ten, a step S17 is executed. When the number α is judged to be not less than eight in the step S17, the number of passers is determined as four in a step S22; when α is judged to be less than eight, a step S18 is executed. When the number α is judged to be not less than six in the step S18, the number of passers is determined as three in a step S23; when α is judged to be less than six, a step S19 is executed. When the number α is judged to be not less than four in the step S19, the number of passers is determined as two in a step S24; when α is judged to be less than four, a step S20 is executed. When the number α is judged to be not less than two in the step S20, the number of passers is determined as one in a step S25; when α is judged to be less than two, it is judged in a step S26 that no human bodies have passed.

Subsequently, the numbers of passers which have been decided for each row 13A, 13B of sensors by the processes in FIG. 6 are compared with each other. Then the smaller number is stored as the number of passers in the memory means 22.

In a step S9 in FIG. 4, the display means 21 displays the number and traveling direction of passers which have been stored in the memory means 22.

In the first embodiment, as mentioned above, the distance variation measuring sensors 12, each including the light emitter 15 and the light receiver 16, are disposed at uniform intervals on the ceiling 5 of the passage 1 in a plurality of rows. The traveling direction of one or more human bodies 8 is detected on the basis of rates of change relative to time in the distance to the human bodies 8, while the number of passers is detected on the basis of the number α of the sensors 12 which have detected a human body. As a result, the number and traveling directions of human bodies passing the specific area 2 can be detected with a high accuracy and with a high degree of reliability.

In addition, the distance variation measuring sensor 12 including the light emitter 15 and the light receiver 16, can be small in size and can be produced at a low cost.

Second Embodiment

FIGS. 7A and 7B illustrate a second embodiment of the invention.

A long, rectangular base body 25 extending in the direction of the width of a passage 1 is mounted on the ceiling 5. On the bottom surface of the base body 25 are provided three rows 26A, 26B, and 26C of sensors. Each of the rows includes ten distance variation measuring sensors 12 arranged at uniform intervals D.

The sensors 12, constituting the rows 26A to 26C of sensors, are mounted to the base body 25 so that detection areas 27a, 27b, and 27c are defined from the ceiling 5 toward a floor 4. The orientations in which the sensors 12 are mounted are different for each row 26A, 26B, 26C of sensors. Thus the angles which the detection areas 27a to 27c form with the vertical direction are different for each row 26A, 26B, 26C of sensors.

The sensors 12 constituting the center row 26B of sensors are mounted to the base body 25 so that the detection areas 27b are defined in the downward orientation generally along the vertical direction. The sensors 12 in the row 26A of sensors on the left side of FIG. 7A are mounted to the base body 25 so that the detection areas 27a point to the left of the downward orientation along the vertical direction (in a direction containing the leaving direction). The sensors 12 in the row 26C of sensors on the right side of FIG. 7A are mounted to the base body 25 so that the detection areas 27c point to the right of the downward orientation along the plumb line (in a direction containing the entering direction).

The other arrangements of the second embodiment are the same as the first embodiment.

For example, the focuses of the sensors 12 constituting the rows 26A to 26C of sensors are set so that the shoulders to head of a human body 8 of an adult person standing right under a sensor 12 can be detected, in the same way as the first embodiment. The interval D between adjoining sensors 12 is set at 20 cm, in the same way as the first embodiment.

The operation of the second embodiment will be described below.

The operation of the second embodiment is the same as that of the first embodiment except for the step S7 and step S8 in the flow chart of FIG. 4. The step S7 is for determining the traveling direction of human body. The step S8 is for determining the number of passers.

The traveling direction of human body is decided on the basis of rates of change relative to time in the outputs of distance variation measuring sensors 12 included in the left and right rows 26A, 26C of sensors.

In the case that two conditions are satisfied, it is judged that the human body 8 has moved in the direction designated by the arrow A1 (in the entering direction). One of the conditions is that the rates of change in distance relative to time calculated from the output signals of sensors 12 included in the left row 26A of sensors are negative, which indicates that the human body 8 is moving in such a direction that the body approaches the row 26A of sensors. The other of the conditions is that the rates of change in distance relative to time calculated from the output signals of sensors 12 included in the right row 26C of sensors are positive, which indicates that the human body 8 is moving in such a direction that the body is traveling goes away from the row 26C of sensors.

On the contrary, in the case that two other condition are satisfied, it is judged that the human body 8 has moved in the direction designated by the arrow A2 (in the leaving direction). One of the conditions is that the rates of change in distance relative to time calculated from the output signals of sensors 12 included in the row 26C of sensors on the right side of FIG. 6 are negative. The other of the conditions is that the rates of change in distance relative to time calculated from the output signals of sensors 12 included in the row 26A of sensors on the left side are positive.

In the detection of the number of passers, the processes shown in FIG. 6 are executed for each of the rows 26A to 26C of sensors. Then the smallest of the numbers of passers which have been decided by each of the rows 26A to 26C of sensors is stored as the number of passers in memory means 22.

In the second embodiment, the detection areas 27a, 27c of the distance variation measuring sensors 12 constituting the left and right rows 26A, 26C are inclined relative to the vertical direction. As a result, a change in the distance to a human body 8 can be reliably detected and the traveling direction of a human body 8 can be detected with a higher accuracy and with a high degree of reliability.

In addition, the number of passers can be detected with a higher degree of reliability and with a high accuracy even in the case that a plurality of human bodies pass abreast or even in the case that human bodies pass continuously, because three rows 26A to 26C of sensors are provided.

Furthermore, the apparatus can be simplified and can be made small in size because all the sensors 12 constituting the three rows 26A to 26C of sensors are mounted to one base body 25.

Third Embodiment

Figure 9A:
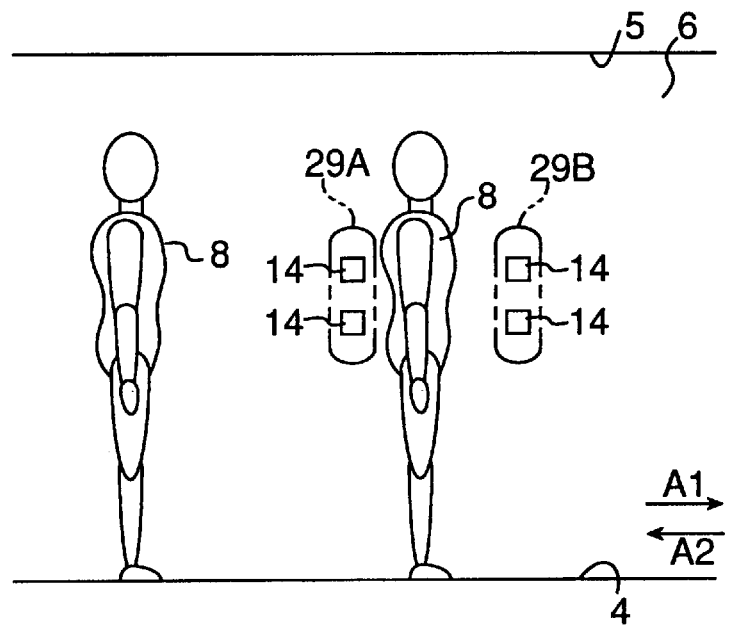
FIG. 9A is a schematic side view of the apparatus of FIG. 8
Figure 9B:
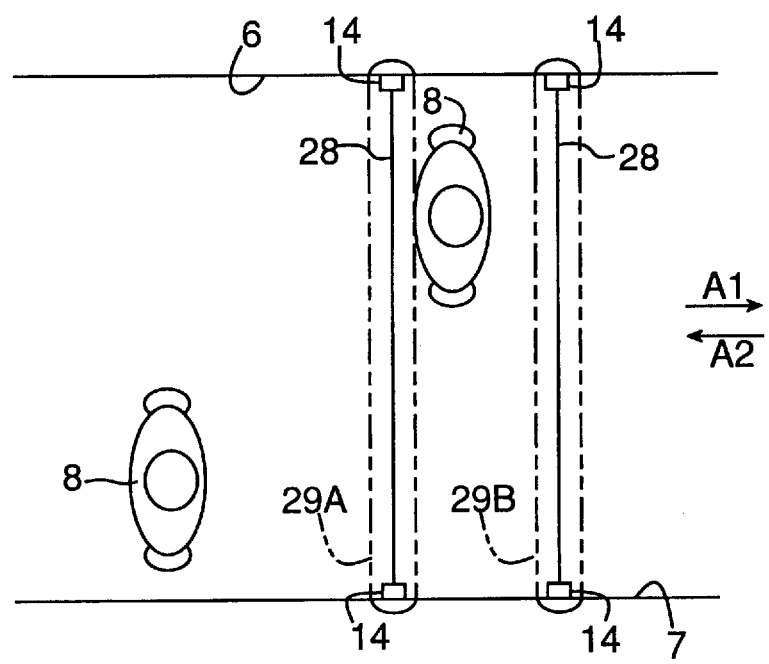
FIG. 9B is a schematic plan view of the apparatus of FIG. 8.

FIGS. 8, 9A and 9B illustrate a third embodiment of the invention.

In the third embodiment, distance measuring sensors 14 are mounted to side walls 6, 7 on the left and right sides of a passage 1 so as to be opposed to each other. A detection area 28 of each distance measuring sensor 14 horizontally extends across the passage 1. More specifically, four pairs of distance measuring sensors 14 which are horizontally opposed are provided. The pairs of sensors form two lines with respect to the direction along the vertical direction and form two lines with respect to the directions in which human bodies 8 pass. Therefore, the total number of the distance measuring sensors 14 is eight. The pairs of distance measuring sensors 14 which form the upper rows are provided at a height corresponding to the shoulder position of an adult person. The pairs of distance measuring sensors 14 which form the lower rows are provided at a height corresponding to the waist position of an adult person. In the following description, the set of four distance measuring sensors 14 which form the two rows situated toward the front with respect to the leaving direction will be referred to as a first set 29A. On the other hand, the set of four distance measuring sensors 14 which form the two rows situated toward the front with respect to the entering direction will be referred to as a second set 29B.

Each distance measuring sensor 14 includes a light emitter 15 and a light receiver 16, in the same way as the distance variation measuring sensor 12. The outputs of the light receiver 15 are inputted into judging means 20-via a signal processing circuit 19. The judging means calculates the distance to the distance measuring sensor on the basis of the inputted signals.

Figure 10:
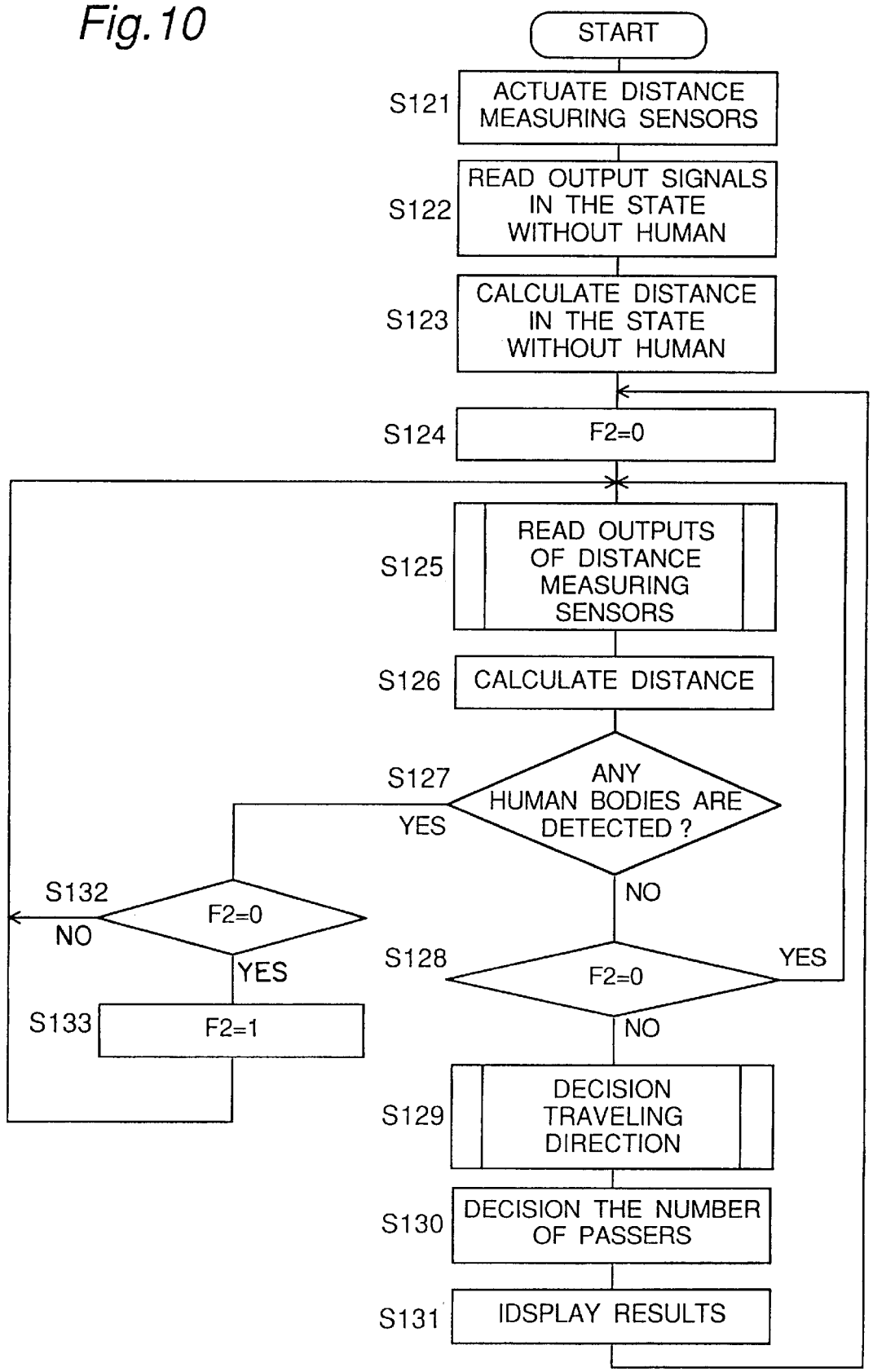
FIG. 10 is a flow chart for explaining the operation of the third embodiment.

Referring to FIG. 10, the operation of the third embodiment will be described.

In a step S121, each distance measuring sensor 14 is actuated. In a step S122, the output signals of each distance measuring sensor 14 in the state without a human body present are read into the signal processing circuit 19 and converted into digital signals. In a step S123, the distance in the state without a human body is calculated from the output signals and the value of the distance is stored in the memory means 22.

In a step S124, a flag F2 is set to an initial value of "0." In a step S125, the output signals of each distance measuring sensor 14 are read into the signal processing circuit 19. In a step S126, the distance is calculated, and the values of the distance and time which have been calculated are stored in the memory means 22. In a step S127, whether any human bodies are detected or not is judged by a comparison between the distance in the state without human body calculated in the step S123 and the distance calculated in the step S126. More specifically, in the case that the distance calculated in the step S126 is smaller than the distance in the state without a human body calculated in the step S123 by not less than a predetermined value for any of the distance measuring sensors 14, it is judged that a human body 8 has been detected. The memory means 22 stores the information on the identification of the distance measuring sensors 14 which have detected a human body and on the point in time when the detection was done.

When it is judged that no human bodies have been detected in the step 127, a step 128 is executed. In the case that the flag F2 is "0" in the step S128, the operation goes back to the step S125.

When it is judged that one or more human bodies have been detected in the step 127, a step 132 is executed. In the case that the flag F2 is "0" in the step S132, the flag F2 is set at "1" in a step S133 and the operation then goes back to the step S125.

In a step S129, the traveling direction of one or more human bodies 8 is determined.

The traveling direction of a human body is determined as follows.

Figure 11:
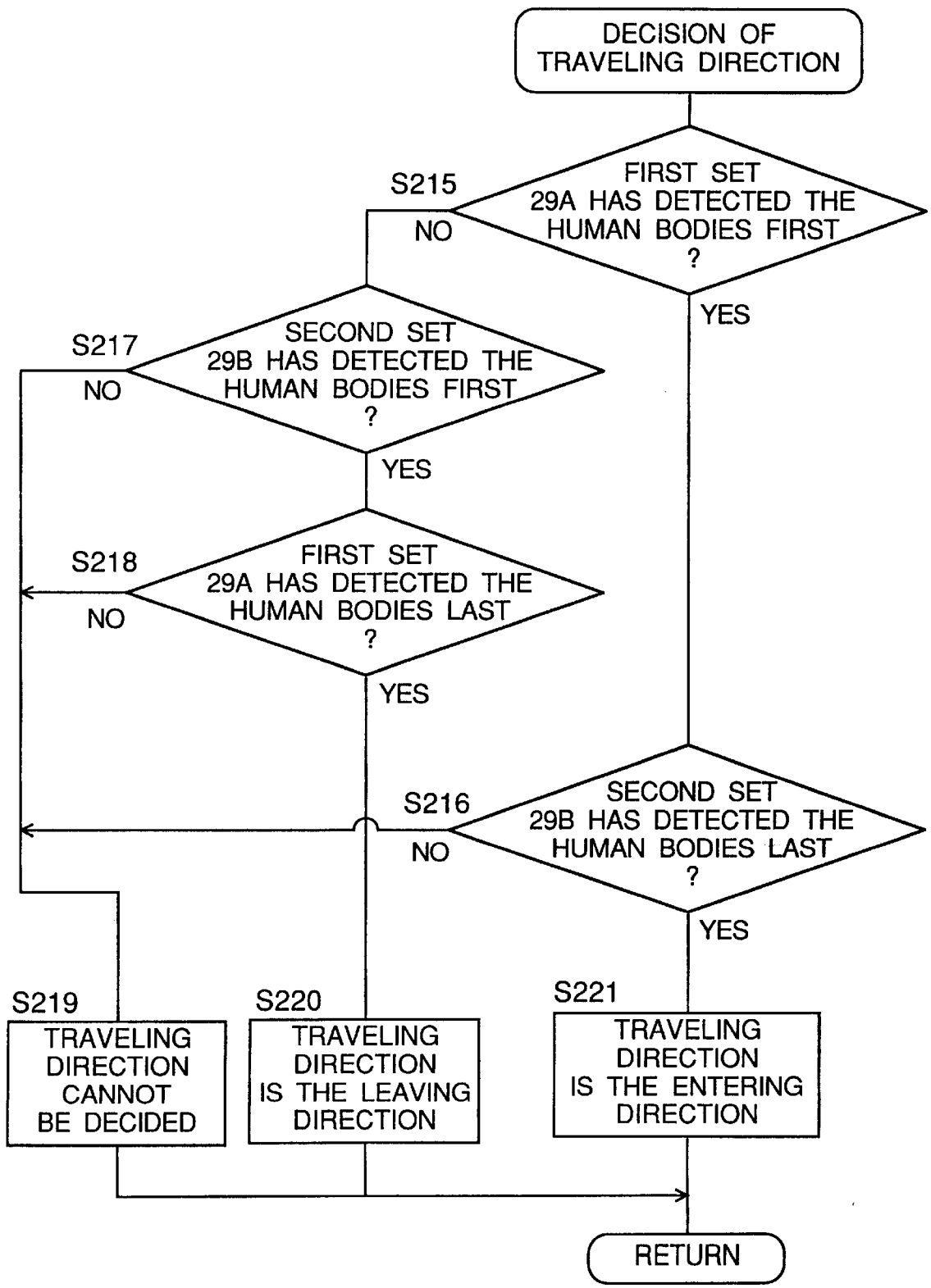
FIG. 11 is a flow chart for explaining the determination of traveling direction (step S129) in the third embodiment.

In a step S215 of FIG. 11, it is judged whether the distance measuring sensor 14 which has detected the human body first is included in the first set 29A or not. In the case that the sensor 14 is included in the first set 29A, a step S216 is executed. In the case that the sensor 14 is not included in the first set 29A, a step S217 is executed.

In the step S216, it is judged whether the distance measuring sensor 14 which has detected the human body last is included in the second set 29B or not. In the case that the sensor 14 is included in the second set 29B, a step S221 is executed and it is judged that the human body has moved in the entering direction (in the direction designated by the arrow A1). On the other hand, in the case that the sensor 14 is not included in the second set 29B, a step S219 is executed and it is judged that the traveling direction cannot be determined.

In the case that the distance measuring sensor 14 which has detected the human body first is not included in the first set 29A in the step S215, the step S217 is executed. In the step S217 it is judged whether the distance measuring sensor 14 which has detected the human body first is included in the second set 29B or not. In the case that the sensor 14 is included in the second set 29B in the step S217, a step S218 is executed. On the other hand, in the case that the sensor 14 is not included in the second set 29B in step S217, the step S219 is executed.

In the step S218, it is judged whether the distance measuring sensor 14 which has detected the human body last is included in the first set 29A or not. In the case that the sensor 14 is included in the first set 29A in the step S218, a step S220 is executed and it is judged that the traveling direction is the leaving direction (the direction designated by the arrow A2). In the case that the sensor 14 is not included in the first set 29A in the step S218, the step S219 is executed.

In the third embodiment, the traveling direction of a human body is thus detected on the basis of the chronological order of the detection of the human body by the distance measuring sensors 14 arranged along the traveling directions of human bodies. As a result, the traveling directions of human bodies can be detected with a high accuracy and with a high degree of reliability.

In a step S130, the number of passers is decided. In the step S130, the processes shown in FIG. 12 are executed for each of the first set 29A and the second set 29B.

Figure 12:
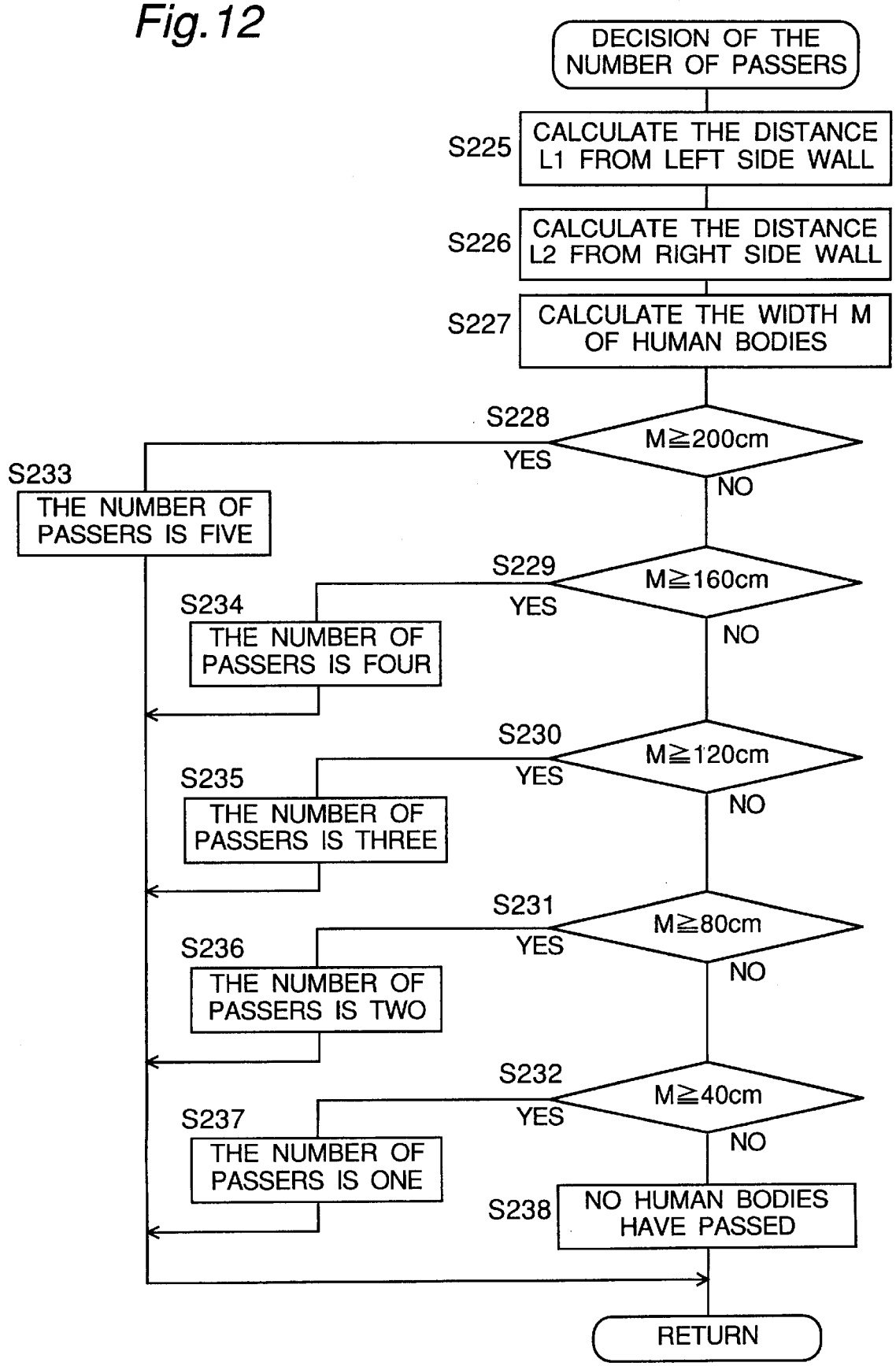
FIG. 12 is a flow chart for explaining the determination of the number of passers (step S130) in the third embodiment.

In a step S225 of FIG. 12, the distance L1 from the side wall 6 on the left side of the passage 1 to one or more human bodies 8 is calculated on the basis of the output signals of a distance measuring sensor 14 in the upper line which has been mounted to the side wall 6 on the left side of FIG. 7. In a step S226, the distance L2 from the side wall 7 on the right side of the passage 1 to the right end of the human bodies 8 is calculated on the basis of the output signals of a distance measuring sensor 14 in the upper line which has been mounted to the side wall 7 on the right side. In a step S227, the width M of the human bodies is calculated by following equation.

$$M = W - L1 - L2$$

When the width M of the human bodies is judged to be not less than 200 cm in a step S228, the number of passers is determined as five in a step S233 because the breadth of the shoulders of an adult person is typically on the order of 40 to 50 cm. When M is judged to be less than 200 cm in the step S228, a step S229 is executed. After that, similarly, it is judged whether the width M of the human bodies is not less than 160, 120, 80, or 40 cm in steps S229 to S232, and the number of passers is determined on the basis of the result of the judgment in steps S234 to S238.

Subsequently, the numbers of passers which have been decided on the basis of the output signals of the distance measuring sensors 14 of the first set 29A and of the second set 29B are compared with each other. When the numbers do not coincide with each other, the smaller number of passers is stored in the memory means 22.

In the third embodiment, as mentioned above, the number of passers can be detected by the measurement of the distances from the side walls 6, 7 to human bodies 8. As a result, the number and traveling directions of passing human bodies can be detected with a high accuracy and with a high degree of reliability even for human bodies forming a line laterally and for human bodies passing continuously.

In a step S131 in FIG. 10, the display means 21 displays the traveling directions of human bodies 8 and the number of passers.

Fourth Embodiment

Figure 14A:
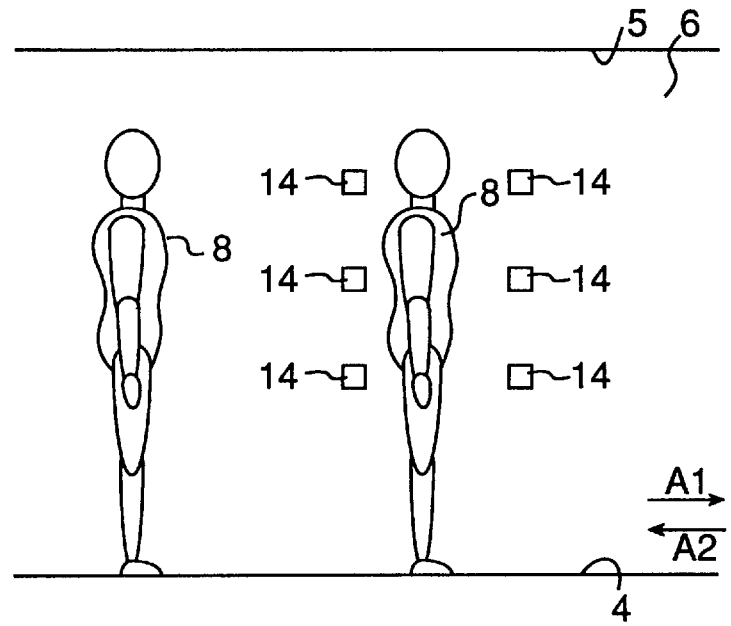
FIG. 14A is a schematic side view of the apparatus of FIG. 11.
Figure 14B:
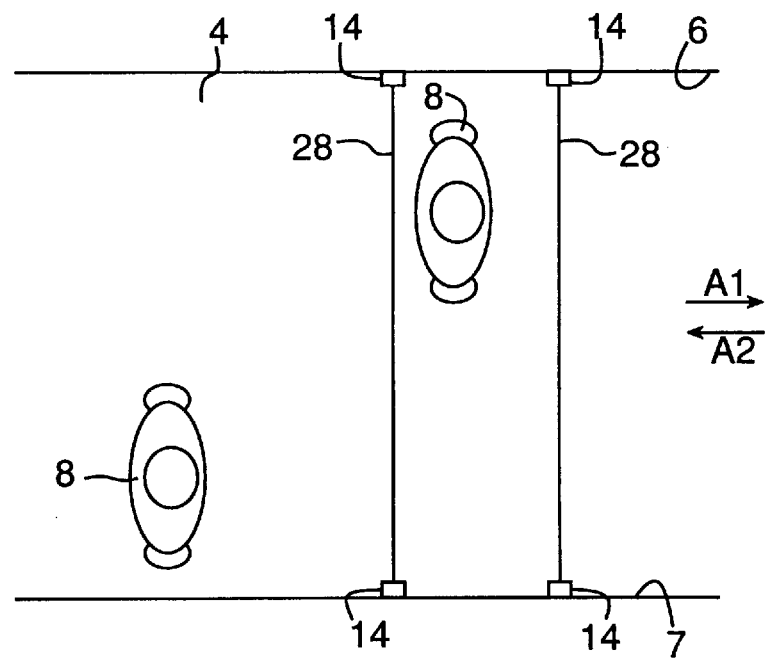
FIG. 14B is a schematic plan view of the apparatus of FIG. 11.

FIGS. 13 and 14 illustrate a fourth embodiment of the invention.

The fourth embodiment is the same as the third embodiment except that six pairs of distance measuring sensors 14 which are horizontally opposed are provided. The pairs of distance measuring sensors form three lines with respect to the direction of height and form two lines with respect to the directions in which human bodies 8 pass. The number of the distance measuring sensors 14 amounts to twelve.

The distance measuring sensors 14 of the upper lines are mounted at a height corresponding to the head position of an adult person. The distance measuring sensors 14 of the middle lines are mounted at a height corresponding to the chest position of an adult person. The distance measuring sensors 14 of the lower lines are mounted at a height corresponding to the thigh position of an adult person.

With the arrangement of the fourth embodiment, even a short human body such as child designated by the reference numeral 8' in FIG. 13 can be reliably detected by the distance measuring sensors 14 of the lower lines.

Fifth Embodiment

The construction of a fifth embodiment, such as the arrangement of distance variation measuring sensors 12, is the same as the first embodiment shown in FIGS. 1 and 2. The operation of the fifth embodiment is the same as the first embodiment except for the way of reading the output signals of sensors 12 in the step S3 of FIG. 4

Figure 15:
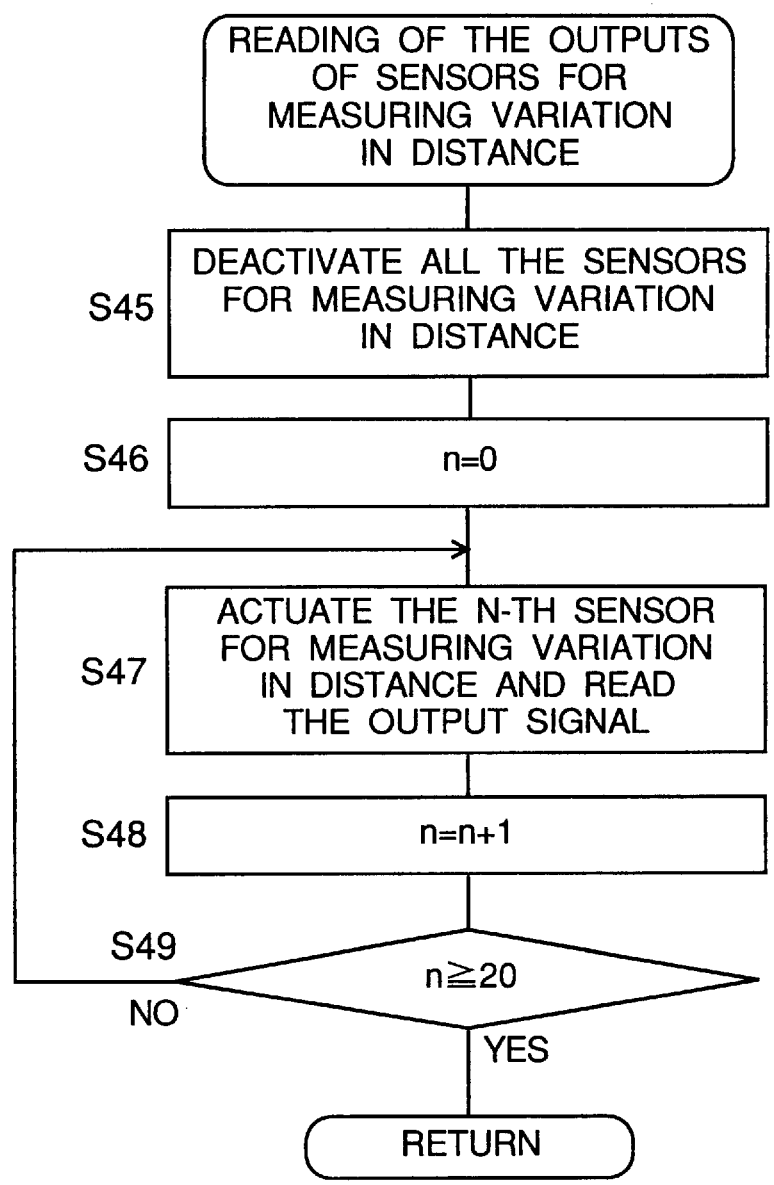
FIG. 15 is a flow chart for explaining the operation of a fifth embodiment.

In the fifth embodiment, all the distance variation measuring sensors 12 are deactivated in a step S45 of FIG. 15. Subsequently, as shown in steps S46 to S49, the sensors 12 are actuated one at a time according to a sequence starting from the sensor 12 located at the left end of a first row 13A of sensors (n=1) and ending in the sensor 12 located at the right end of a second row 13B of sensors (n=20), while the sensors 12 other than the actuated sensor are deactivated during the sequence. The speed of the sequential scanning has to be set sufficiently fast to accommodate the traveling speeds of human bodies. For example, the vicinity of 100 Hz is preferable.

With the operation in which twenty sensors 12 forming two rows 13A, 13B of sensors are actuated one at a time by the sequential scanning, the near-infrared ray emitted from the light emitter 15 of a sensor 12 and then reflected by a human body can be prevented from being incident on the light receivers 16 of other adjoining sensors 12. Thus the accurate output signals are read into signal processing means 19. In accordance with the fifth embodiment, accordingly, the traveling directions and number of traveling human bodies can be detected without malfunction of sensors 12, with a higher accuracy and with an improved reliability.

In the second to fourth embodiments, the distance variation measuring sensors 12 or the distance measuring sensors 14 may be sequentially actuated in the same way as the fifth embodiment.

Sixth Embodiment

Figure 16A:
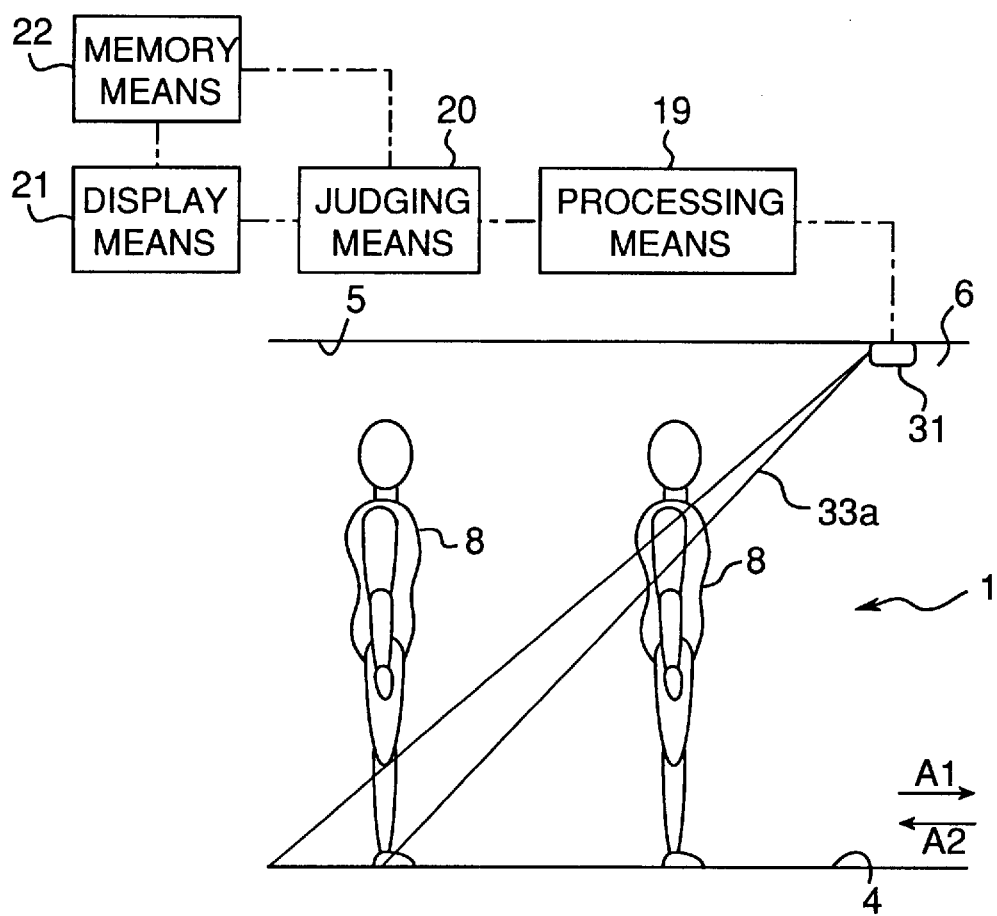
FIG. 16A is a schematic side view illustrating a sixth embodiment
Figure 16B:
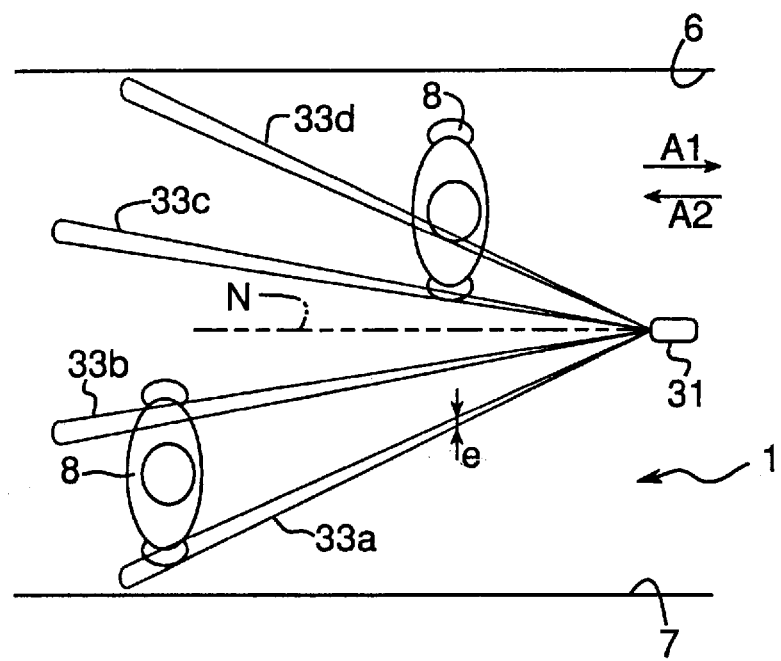
FIG. 16B is a schematic plan view illustrating the sixth embodiment.
Figure 17:
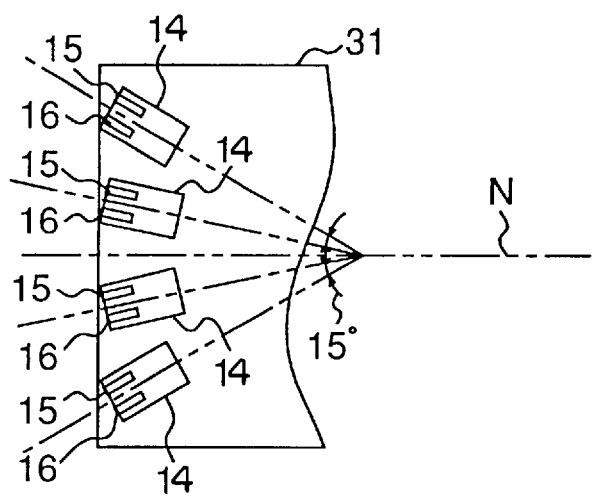
FIG. 17 is a schematic representation illustrating orientations in which distance measuring sensors are mounted.

FIGS. 16A, 16B and 17 illustrate a sixth embodiment of the invention.

As shown in FIG. 16A, 16B, four distance measuring sensors 14 are mounted together to a base body 31 mounted at the center of the width of a ceiling 5 of a passage 1. The construction of a distance measuring sensor 14 includes a light emitter 15 and a light receiver 16 as same as the third embodiment.

The distance measuring sensors 14 are mounted to the base body 31 so that their detection areas 33a to 33d extend from the ceiling 5 toward a floor 4 at a downward angle to the left (in the leaving direction). The orientations in which the distance measuring sensors 14 are mounted are different relative to the center line N of the width of the passage 1. The detection areas 33a to 33d of the four distance measuring sensors 14 are spread like a fan or a sector at intervals generally of 15 degrees along the width of the passage 1.

The width e of the detection areas 33a to 33d of the distance measuring sensors 14 at a height corresponding to the shoulders or head of a human body 8 shown in FIG. 16B is set at 20 cm smaller than the breadth of the shoulders of a human body 8 (40 to 50 cm).

The other arrangements of the sixth embodiment are the same as the first embodiment.

The operation of the sixth embodiment will be described below.

The operation of the sixth embodiment is the same as that of the third embodiment shown in the flow chart of FIG. 10 with the exception that the process of determining the number of passers (the step S130) is different from the third embodiment.

Figure 18:
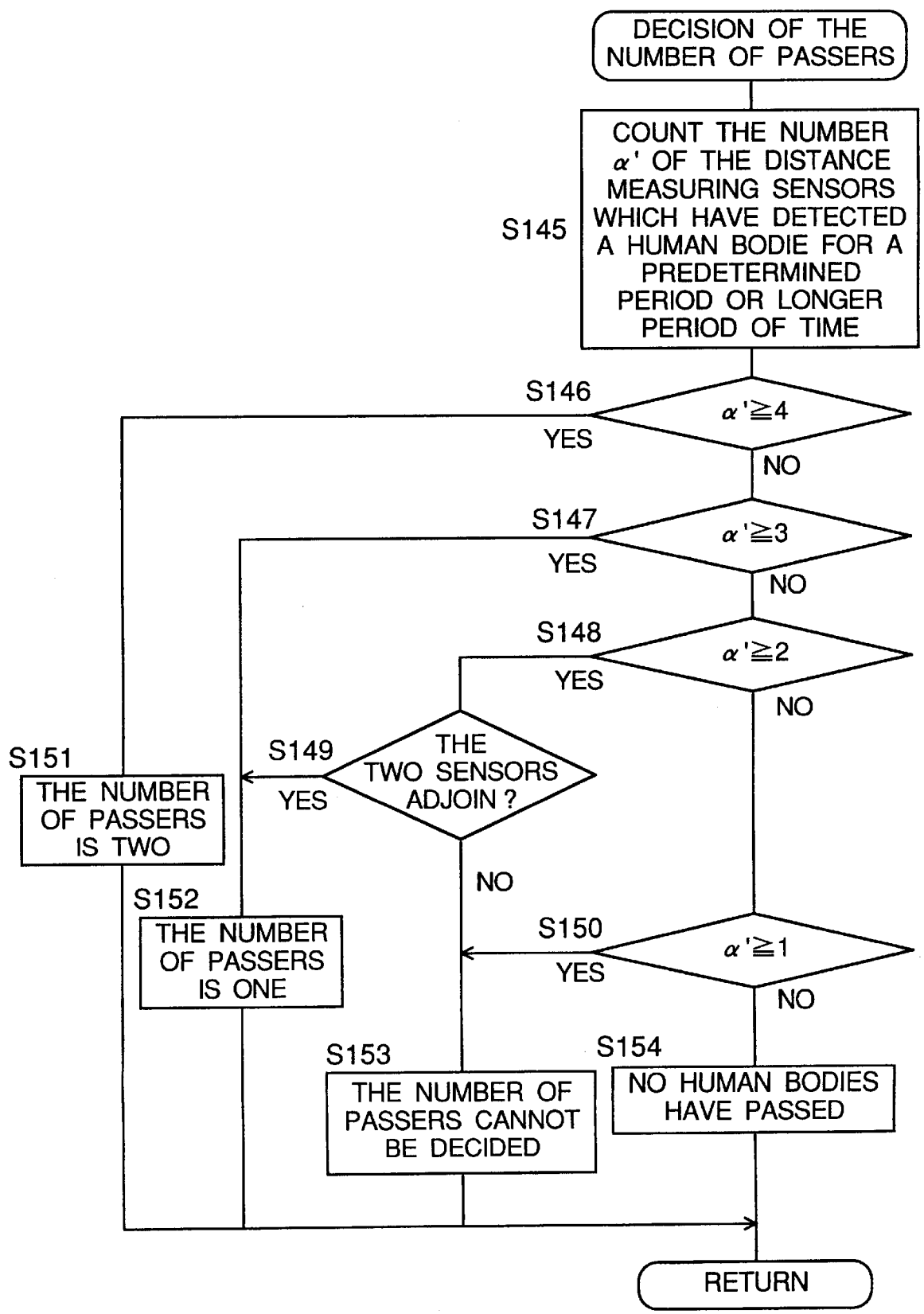
FIG. 18 is a flow chart for explaining the determination of the number of passers in the sixth embodiment.

In the determination of the number of passers in the sixth embodiment, first, in a step S145 of FIG. 18, the number α' of the distance measuring sensors 14 which have detected a human body 8 for a predetermined period of time or longer is counted. Next, in a step S146, it is judged whether the number α' is not less than four. When α' is not less than four, a step S151 is executed, when α' is less than four, a step S147 is executed. In the step S151, the number of passers is determined as two. In the step S147, it is judged whether the number α' is not less than three. When α' is not less than three, a step S152 is executed and the number of passers is determined as one. When α' is judged to be less than three in the step S147, a step S148 is executed. In the step S148, it is judged whether the number α' is not less than two. When α' is not less than two, a step S149 is executed. When α' is less than two, a step S150 is executed. In the step S149, it is judged whether the two distance measuring sensors 14 which have detected the human bodies 8 for the predetermined period or longer period of time adjoin or not. In the case that the sensors adjoin, the step S152 is executed. In the case that the sensors do not adjoin, a step S153 is executed. In the step S150, it is judged whether the number α' is not less than one. When α' is not less than one, the step S153 is executed. When ' is less than one, a step S154 is executed and it is judged that no human bodies have passed.

The traveling direction is decided on the basis of the change in the outputs of the distance measuring sensors 14. That is, when the distance to a human body 8 measured by a distance measuring sensor 14 decreases with time, it is judged that the human body 8 is moving in the entering direction designated by the arrow A1. On the other hand, when the distance increases with time, it is judged that the human body 8 is moving in the leaving direction designated by the arrow A2.

In the sixth embodiment, the detection areas 33a to 33d of the distance measuring sensors 14 are so formed as to represent a sector. As a result, even human bodies forming a line laterally and human bodies passing continuously can be correctly detected, and the number and traveling directions of passers can be detected with a high accuracy.

In addition, the apparatus can be small in size and can be simplified because the four distance measuring sensors 14 are mounted together to the base body 31 mounted at a position on the ceiling 5, as mentioned above.

In the sixth embodiment, five or more distance measuring sensors may be provided. In this case, the angle between adjoining detection areas may be set narrower so that the detection of human body by three distance measuring sensors for a predetermined period or longer period of time leads to the judgment concluding that one human body has passed.

Seventh Embodiment

Figure 19B:
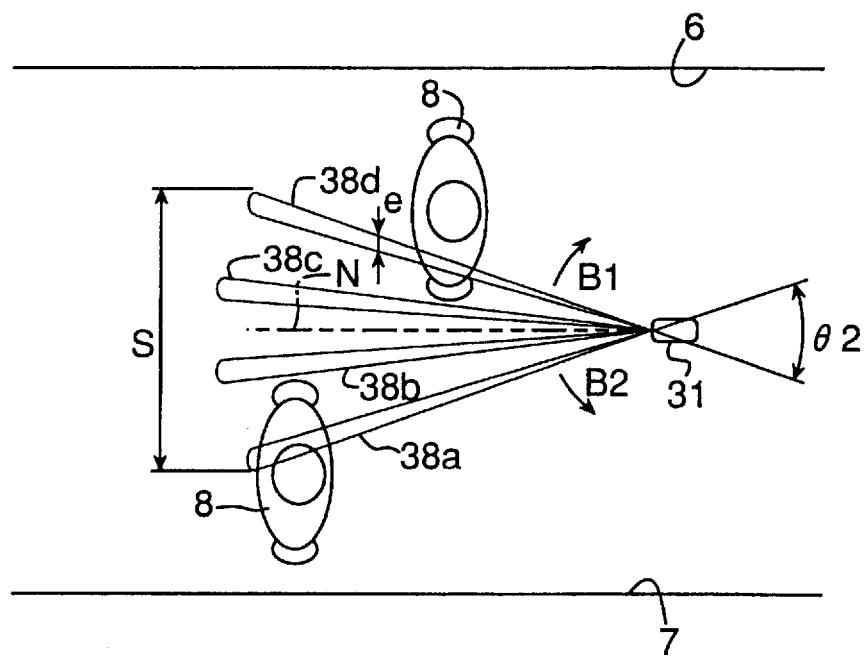
FIG. 19B is a schematic plan view illustrating the seventh embodiment.

FIGS. 19 and 20 illustrate a seventh embodiment of the invention.

In the seventh embodiment, four distance measuring sensors 14 are mounted to a base body 31 in the same way as the sixth embodiment. There is provided driving means 37 which rotates the base body 31 reciprocately about an axis P extending along the vertical direction in response to a command from control means 36.

The detection areas 38a to 38d of the four distance measuring sensors 14 are defined so as to extend at a downward angle to the left in the drawing, and the areas are oriented at intervals of 15 degrees along the width of a passage 1 so as to represent a sector. The overall dimension S, along the width of the passage 1, of the detection areas 38a to 38d projected on a floor 4 is about one-half of the width W of the passage 1. The width e of each detection area 38*a*–38*d* for one distance measuring sensor 14, measured at a height corresponding to the head to shoulders of an adult person, is set at not more than 10 cm so as not to be greater than the breadth of the shoulders of a human body (40 to 50 cm).

The other arrangements of the seventh embodiment are the same as the sixth embodiment.

The operation of the seventh embodiment will be described below.

Figure 20A:
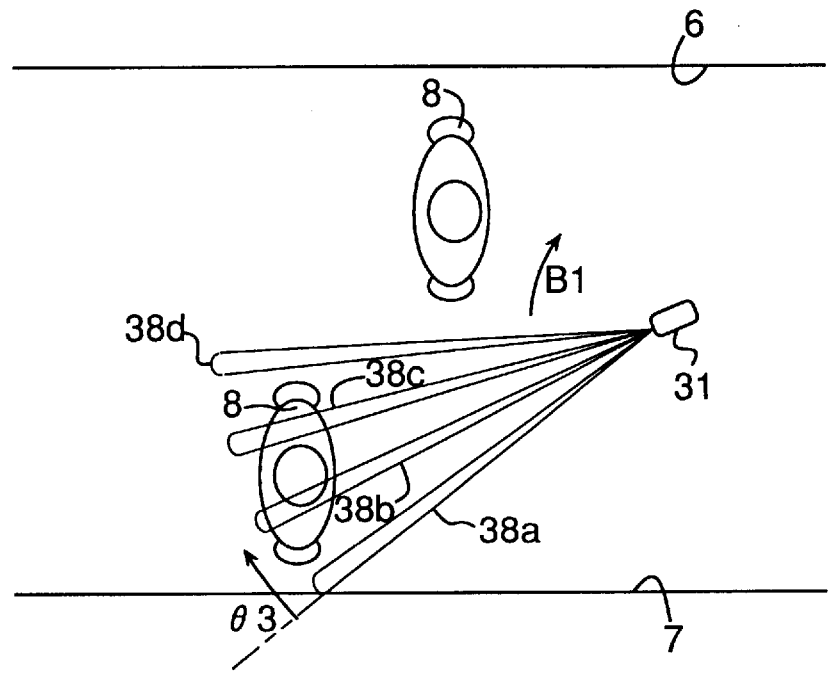
FIG. 20A is a schematic plan view illustrating the state in which angle position θ3 is zero degrees
Figure 20B:
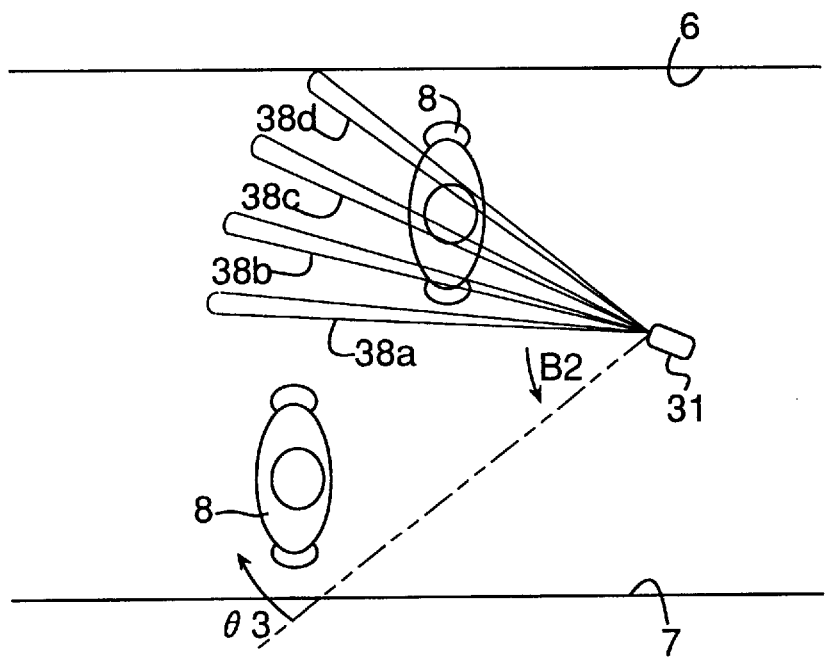
FIG. 20B is a schematic plan view illustrating the state in which angle position θ3 is 40 degrees.

The driving means 37 rotates the base body 31 reciprocately and continuously between two positions. At a first position, as shown in FIG. 20A, the detection areas 38*a* to 38*d* are defined over the half of the passage 1 on the right side with respect to the width of the passage 1. At second position, as shown in FIG. 20B, the detection areas are defined over the half of the passage 1 on the left side with respect to the width of the passage 1. That is, the base body 31 rotates reciprocately through an arc θ2 of 40 degrees which is symmetrical about the center line N of the width of the passage 1. The speed at which the base body 31 rotates is set sufficiently fast to accommodate speeds of human bodies 8 passing the passage 1.

In the following description, angle positions θ3 of the base body 31 and of the detection areas 38*a* to 38*d* will be defined relative to the state shown in FIG. 20A in which the detection areas 38*a* to 38*d* are in the far-right position with respect to the width of the passage 1.

The operation of the seventh embodiment is the same as that of the third embodiment shown in FIG. 10 with the exception that the practical processes in the steps S122, S125, S126, S127, S129, and S130 of FIG. 10 are different from the third embodiment.

In the step S122 (of reading the output signals in the state without human body), the output signals of each distance measuring sensor 14 are read while the driving means 37 rotates the base body 31. In the step S123, the distance is calculated for each distance measuring sensor 14 and for each of angle positions θ3 of 0 degrees, 10 degrees, 20 degrees; 30 degrees, and 40 degrees.

In the step S125 (of reading the output signals of the distance measuring sensors), the driving means 37 rotates the base body 31. While the base body 31 and the detection areas 38*a* to 38*d* rotate from the angle position θ3 of 0 degrees (FIG. 20A) to the angle position θ3 of 40 degrees (FIG. 20B) as illustrated by the arrow B1, the output signals of the distance measuring sensors 14 are read. While the base body 31 and the detection areas 38*a* to 38*d* pivot from the angle position θ3 of 40 degrees (FIG. 20B) to the angle position θ3 of 0 degrees (FIG. 20A) as illustrated by the arrow B2, the output signals of the distance measuring sensors 14 are not read.

In the step S126 (calculation of distances), from the output signals of the distance measuring sensors 14 read in the step S125, the distance is calculated for each distance measuring sensor 14 and for each of the angle positions θ3 of 0 degrees, 10 degrees, 20 degrees, 30 degrees, and 40 degrees.

In the step S127, the distance calculated in the step S126 is compared with the distance in the state without a human body present calculated in the step S123, for each distance measuring sensor 14 and for each of the angle positions θ3. In the case that the distance calculated in the step S126 is smaller than the distance in the state without a human body by not less than a predetermined value, it is judged that one or more human bodies have been detected.

In the step S129 (decision of traveling direction), a change in the distance calculated in the step S126 is examined for each distance measuring sensor 14 and for each of the angle positions θ3. When the distance calculated in the step S126 decreases with time, it is judged that one or more human bodies 8 are moving in the entering direction (in the direction of the arrow A1). While, when the distance calculated in the step S126 increases with time, it is judged that one or more human bodies 8 are moving in the leaving direction (in the direction of the arrow A2).

Figure 21:
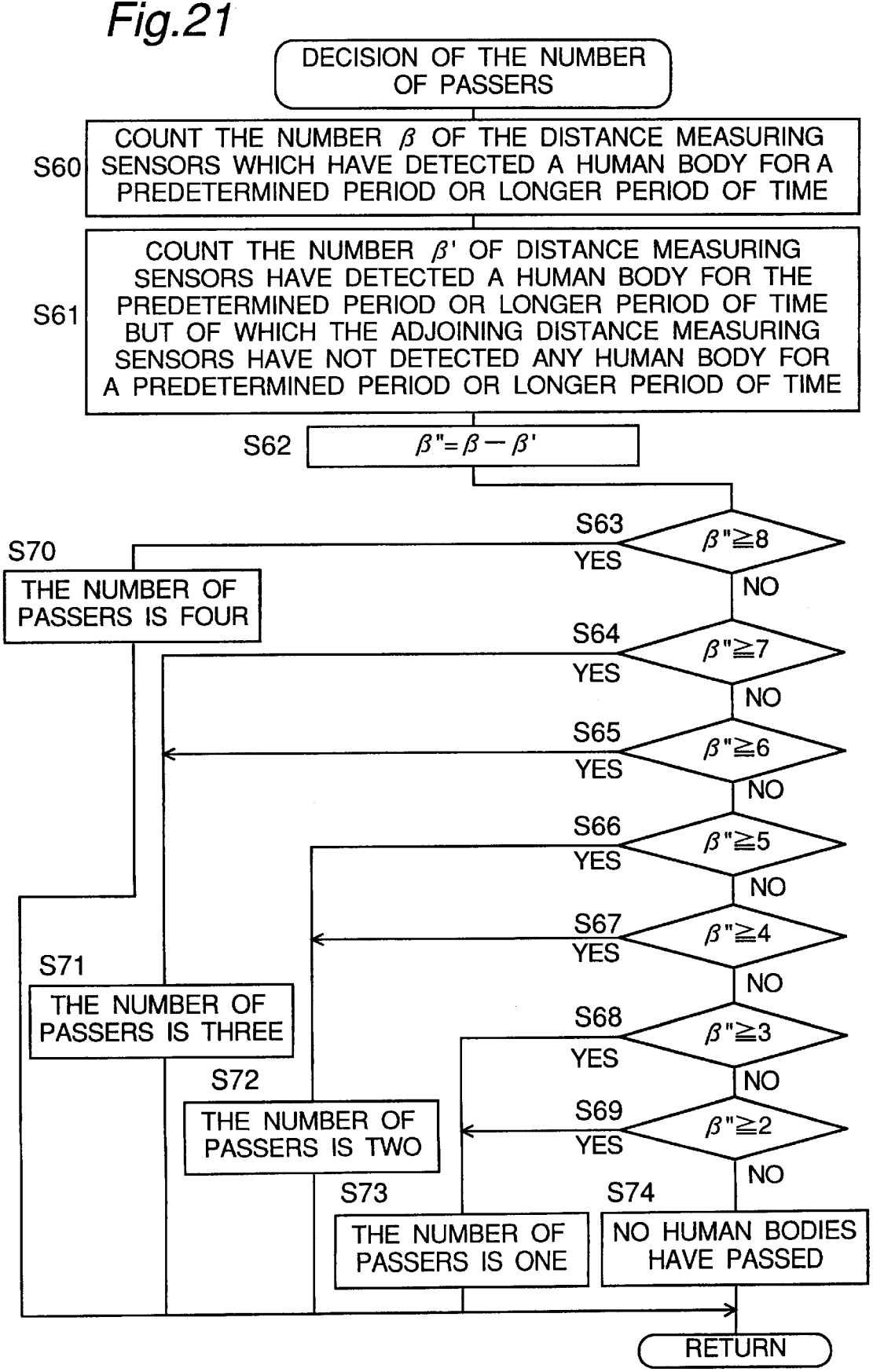
FIG. 21 is a flow chart for explaining the determination of the number of passers in the seventh embodiment.
Figure 22:
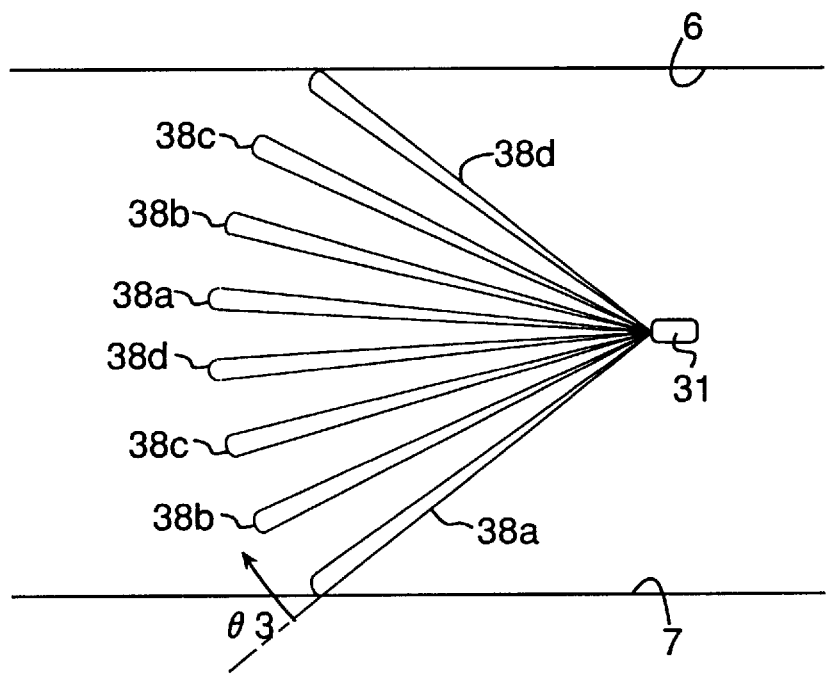
FIG. 22 is a schematic representation for explaining the principle of the determination of the number of passers in the seventh embodiment.

In the step S130 (decision of the number of passers), the processes shown in FIG. 21 are executed. In the processes of FIG. 21, as shown in FIG. 22, eight distance measuring sensors 14 are assumed to exist by the superimposition of the state in which the angle position α3 is 0 degrees (FIG. 20A) on the state in which the angle position α3 is 40 degrees (FIG. 20B).

In a step S60, the number β of the distance measuring sensors 14 which have detected a human body 8 for a predetermined period or longer period of time is counted. Next, in a step S61, the number β' of the distance measuring. sensors 14 of which at least one of the adjoining distance measuring sensors 14 have not detected any human body 8 for a predetermined period or longer period of time is counted, out of the distance measuring sensors 14 which have detected a human body 8 for the predetermined period or longer period of time.

In a step S62, the difference β" between β and β' is calculated.

In a step S63, whether β" is not less than eight is judged. When β" is not less than eight, it is judged that the number of passers is four in a step S70.

In a step S64, whether β" is not less than seven is judged. When β" is not less than seven, it is the judged that the number of passers is three in a step S71. In a step S65, whether 62 " is not less than six is judged. When β" is not less than six, it is judged that the number of passers is three in the step S71.

In a step S66, whether ⊕" is not less than five is judged. When α" is not less than five, it is judged that the number of passers is determined as two in a step S72. In a step S67, whether β" is not less than four is judged. When β" is not less than four, it is judged that the number of passers is determined in the step S72.

In a step S68, whether β" is not less than three is judged. When β" is not less than three, it is judged that the number of passers is one in a step S73. In a step S69, whether β" is not less than two is judged. When β" is not less than two, it is judged that the number of passers is one in the step S73. When β" is judged to be less than two in the step S69, it is judged, in a step S74, that no human bodies have passed.

In the embodiment, as mentioned above, the base body 31 to which four distance measuring sensors 14 are mounted with the orientations of their detection areas 38*a* to 38*d* differing is mounted to the ceiling 5 and, by the pivotal motion of the base body 31, the movement of one or more human bodies 8 can be detected over the whole width of the passage 1. As a result, in the same manner as the sixth embodiment, even human bodies forming a line laterally and human bodies passing continuously can be correctly detected, and the number and traveling directions of passing human bodies can be detected with a high accuracy and with a high degree of reliability.

Eighth Embodiment

The construction of an eighth embodiment, such as the arrangement of distance measuring sensors 14, is the same as the sixth embodiment shown in FIG. 16 except for the way of reading the output signals of distance measuring sensors 14 (step S125 of FIG. 10).

That is, in the eighth embodiment, four distance measuring sensors 14 are actuated one at a time sequentially from the far-left or far-right distance measuring sensor 14 at a rate of 10 kHz, in the same manner as the fifth embodiment.

With the operation in which four distance measuring sensors 14 are actuated one at a time sequentially, the near-infrared ray emitted from the light emitter 15 of a distance measuring sensor 14 and then reflected by a human body 8 can be prevented from being incident on the light receivers 16 of other adjoining distance measuring sensors 14. As a result, the malfunction of the distance measuring sensors 14 can be prevented and the traveling directions and number of traveling human bodies can be detected with a higher accuracy and with a high degree of reliability.

Such sequential actuation may be introduced into the seventh embodiment. The rate of the sequential actuation is not limited to 10 kHz but has only to be sufficiently fast with respect to traveling speeds of human bodies.

Ninth Embodiment

Figure 23:
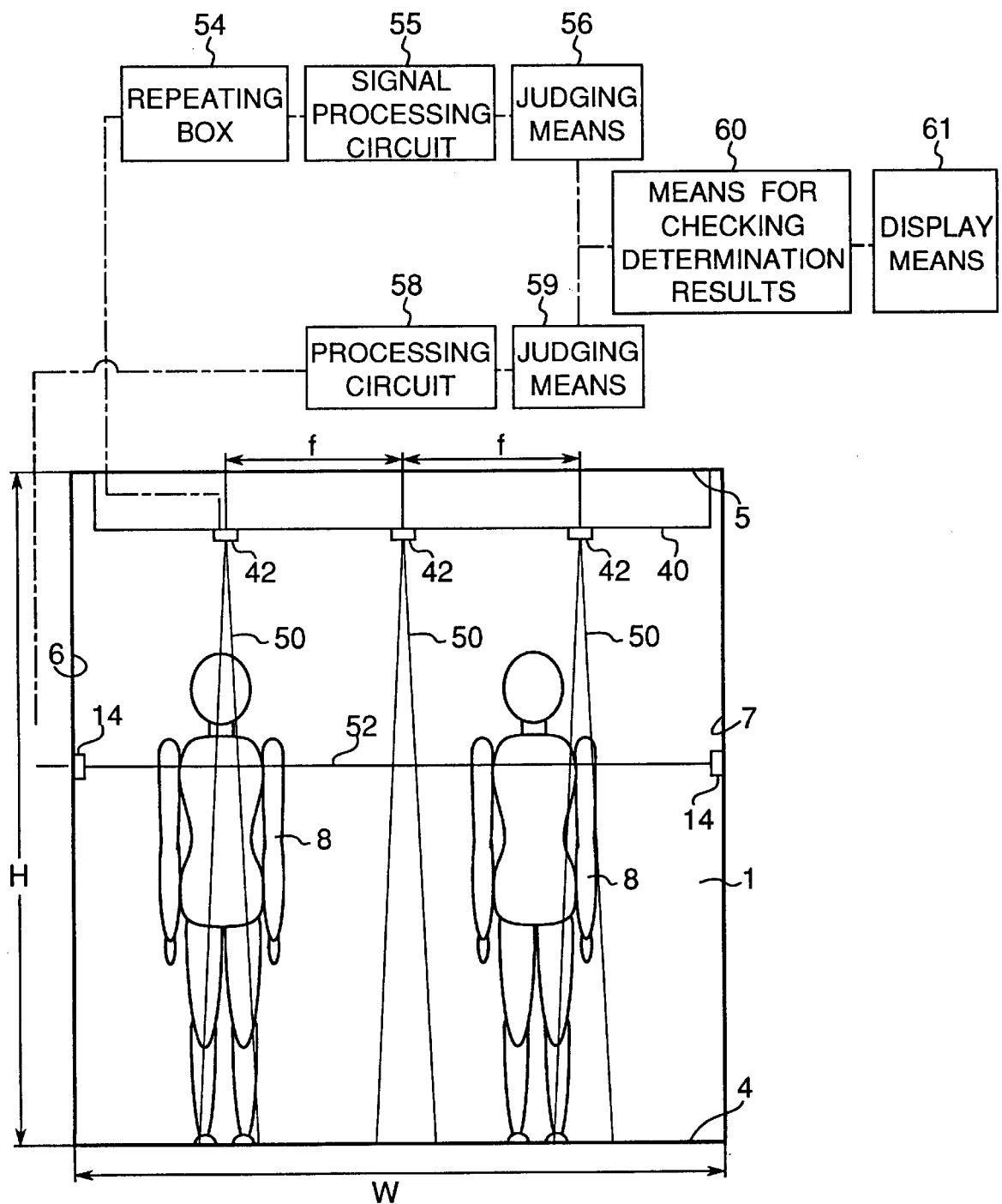
FIG. 23 is a schematic elevation view illustrating an apparatus for detecting the number of passers of a ninth embodiment.
Figure 24A:
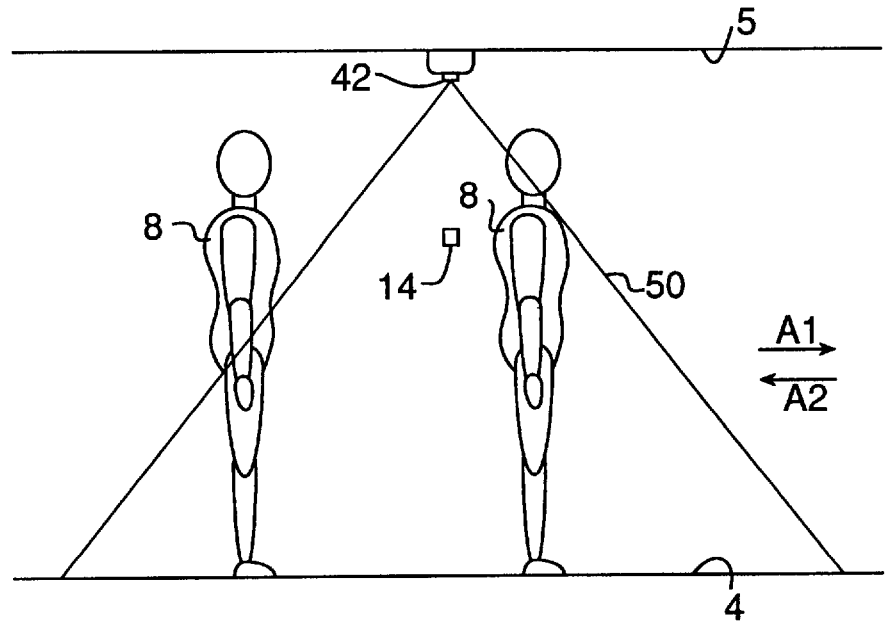
FIG. 24A is a schematic side view of the apparatus of FIG. 23.
Figure 24B:
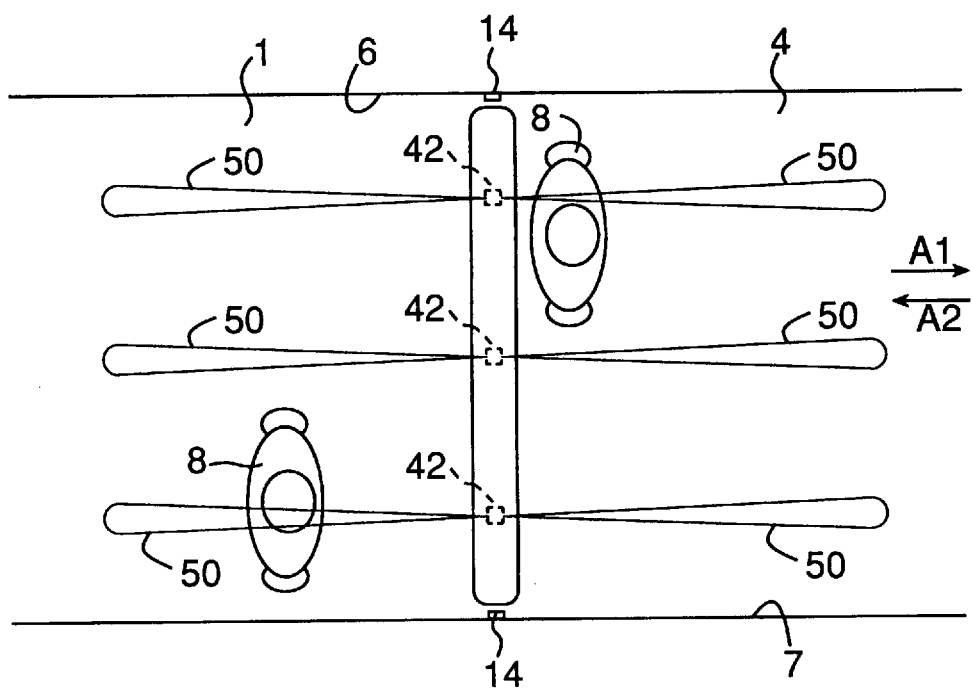
FIG. 24B is a schematic plan view of the apparatus of FIG. 23.
Figure 25:
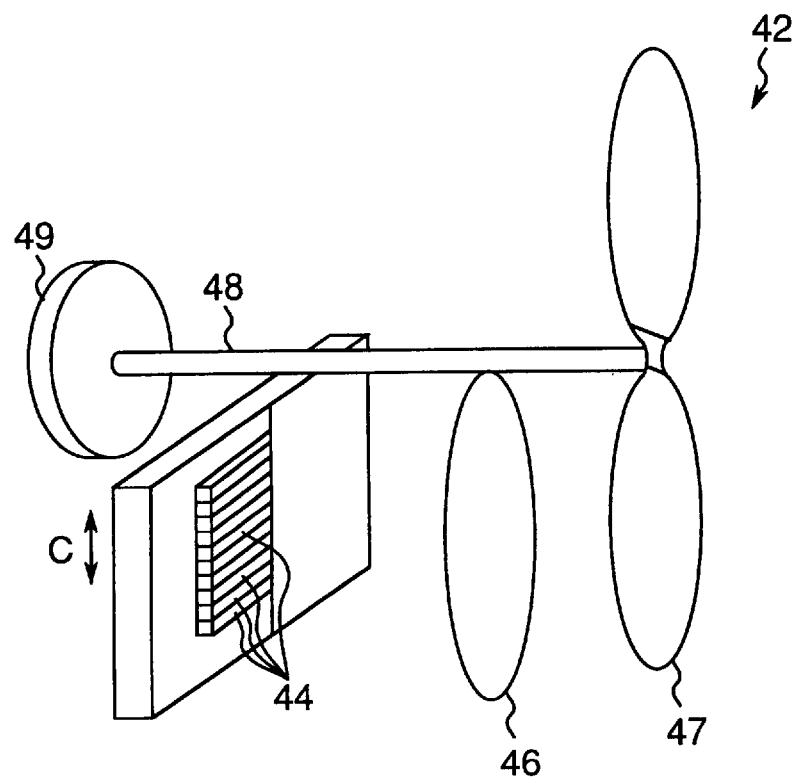
FIG. 25 is a schematic representation illustrating the structure of an infrared sensor.

FIGS. 23 to 25 illustrate a ninth embodiment of the invention.

An elongated base body 40 extending along the width of a passage 1 is mounted to a ceiling 5 of the passage 1, and three infrared sensors 42 are mounted to the base body 40 at uniform intervals f (60 cm).

As shown in FIG. 25, the infrared sensor 42 is a pyroelectric infrared sensor comprising eight pyroelectric elements 44 each shaped in an elongated rectangular parallelepiped and a lens 46. In front of the lens 46 choppers 47 are provided, which intermittently intercept the infrared ray incident upon the lens 46. The choppers 47, fixed to one end of a shaft 48, are driven and rotated by a brushless motor 49 coupled to the other end of the shaft 48. The infrared sensors 42 are considerably small in size.

Each infrared sensor 42 is mounted with the lens 46 and choppers 47 facing a floor 4 so that a detection area 50 in which the infrared radiation emitted by a human body 8 can be detected is defined so as to extend in a downward direction.

Each infrared sensor 42 is mounted so that the direction in which the eight pyroelectric elements 44 are arranged (the directions designated by the arrow C in FIG. 25) is the same as the direction in which human bodies 8 pass. The detection area 50 of each infrared sensor 42 is spread over 4.5 degree range along the width of the passage 1 and over 70 degree range along the direction in which the passage 1 extends. That is, the detection area 50 is defined so as to be narrow with respect to the width of the passage 1 and so as to be wide with respect to the direction in which the passage 1 extends.

The infrared sensors 42 are provided at uniform intervals f of 60 cm in the passage 1 having a width W of 210 cm. Accordingly, the intervals between side walls 6, 7 and the detection areas 50 are between 40 and 50 cm. As a result, even one or more human bodies 8 passing through both end sections of the widths of the passage 1 are reliably detected by the infrared sensors 42.

To the side walls 6, 7 on the left and right sides of the passage 1 are mounted a pair of distance measuring sensors 14 so as to be opposed to each other. A detection area 52 of each of the distance measuring sensors 14 horizontally extends across the passage 1. The height of the distance measuring sensors 14 from the floor 4 is set at a height corresponding to the shoulder position of an adult person.

As shown in FIG. 23, the three infrared sensors 42 are connected to judging means 56 via a repeating box 54 and via a signal processing circuit 55. The distance measuring sensors 14 are connected to judging means 59 via a signal processing circuit 58. Display means 61 is connected to the judging means 56, 59 via means 60 for checking determination results.

Figure 26A:
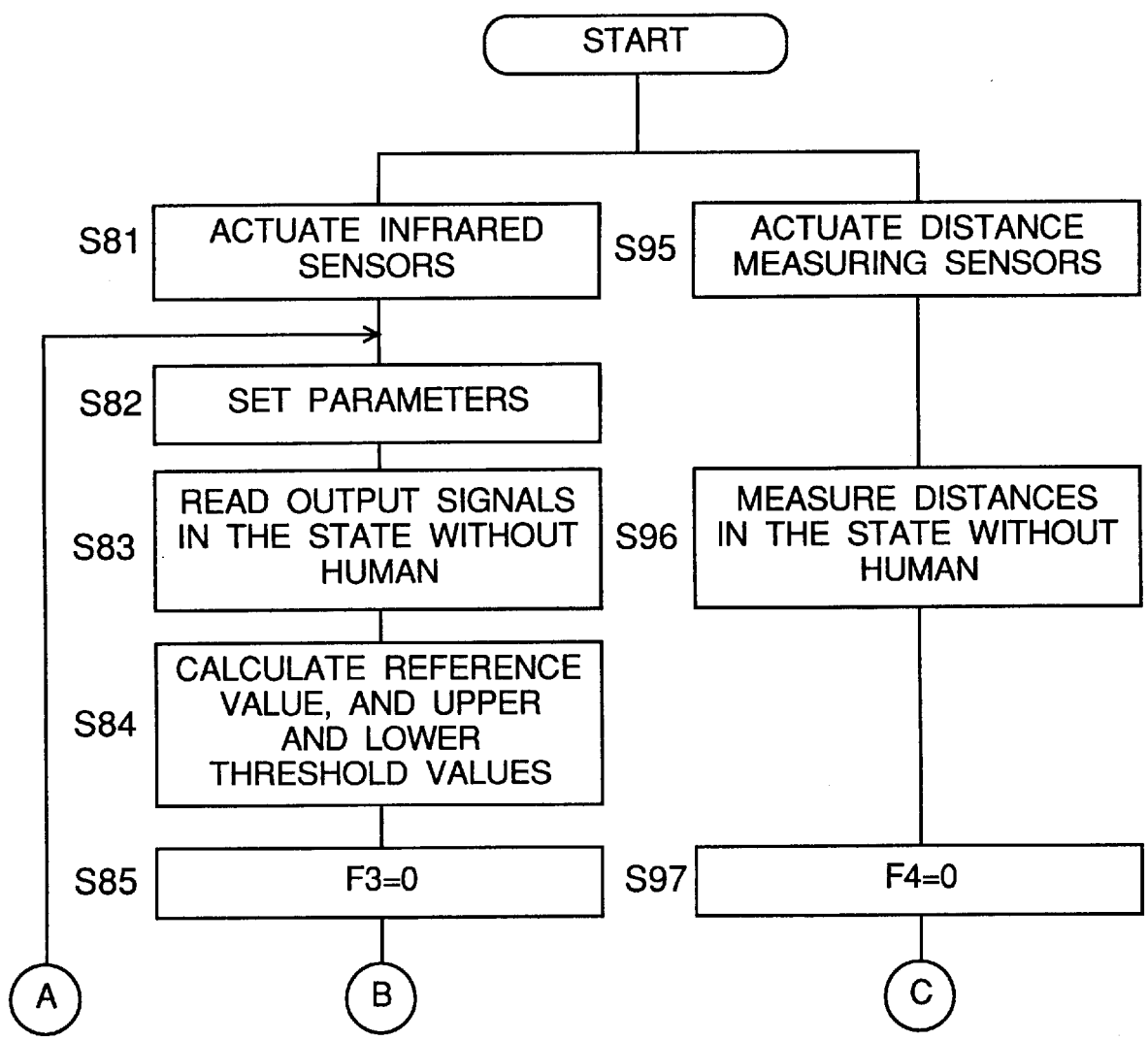
FIG. 26A is a flow chart for explaining the operation of the ninth embodiment.
Figure 26B:
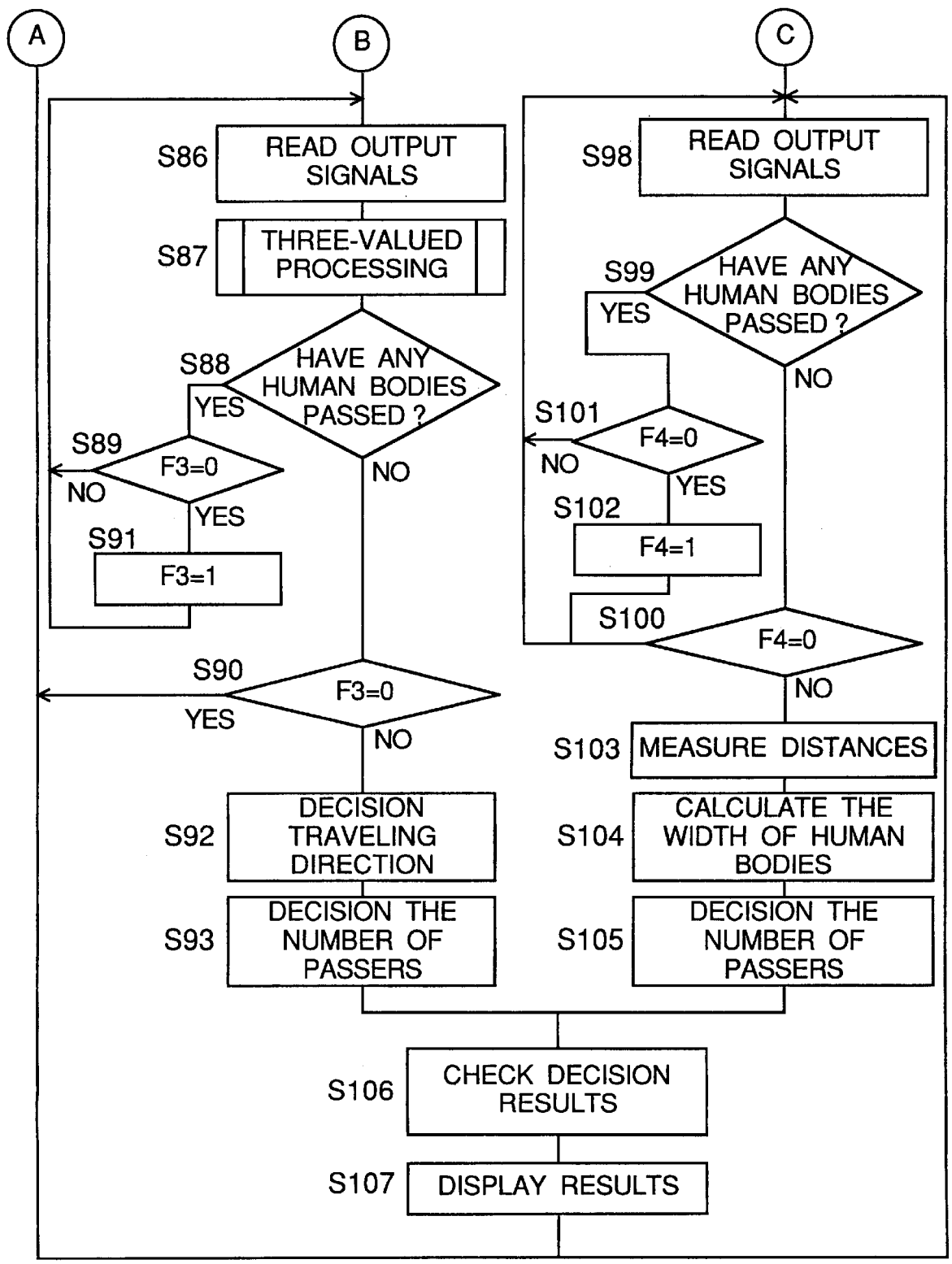
FIG. 26B is a flow chart for explaining the operation of the ninth embodiment.

Referring to FIG. 26A and 26B, the operation of the ninth embodiment will be described.

In FIG. 26A and 26B, steps S81–93 for processing the output signals of the infrared sensors 42 and steps S95–105 for processing the output signals of the distance measuring sensors 14 are executed in parallel.

In the step S81, the infrared sensors 42 are actuated. In the step S82, every parameter is set. Subsequently, the output signals of the infrared sensors 42 in the state without human body, i.e., the output signals indicating the intensities of infrared radiations emitted by the surface of the floor 4 as background are read into the signal processing circuit 55 for a predetermined period of time (step S83).

In the step S84, the signal processing circuit 55 converts the outputs of the infrared sensors 42 from analogue form into digital form. Then, the signal processing circuit 55 calculates the average intensity of the background radiation as a reference value, and upper and lower threshold values deviating from the reference value by a predetermined value. In an step S85, a flag F3 is set at the initial value of "0."

In the step S86, the output signals of the infrared sensors 42 are read into the signal processing circuit 55. In the step S87, three-valued processing is performed on the signals.

Figure 27:
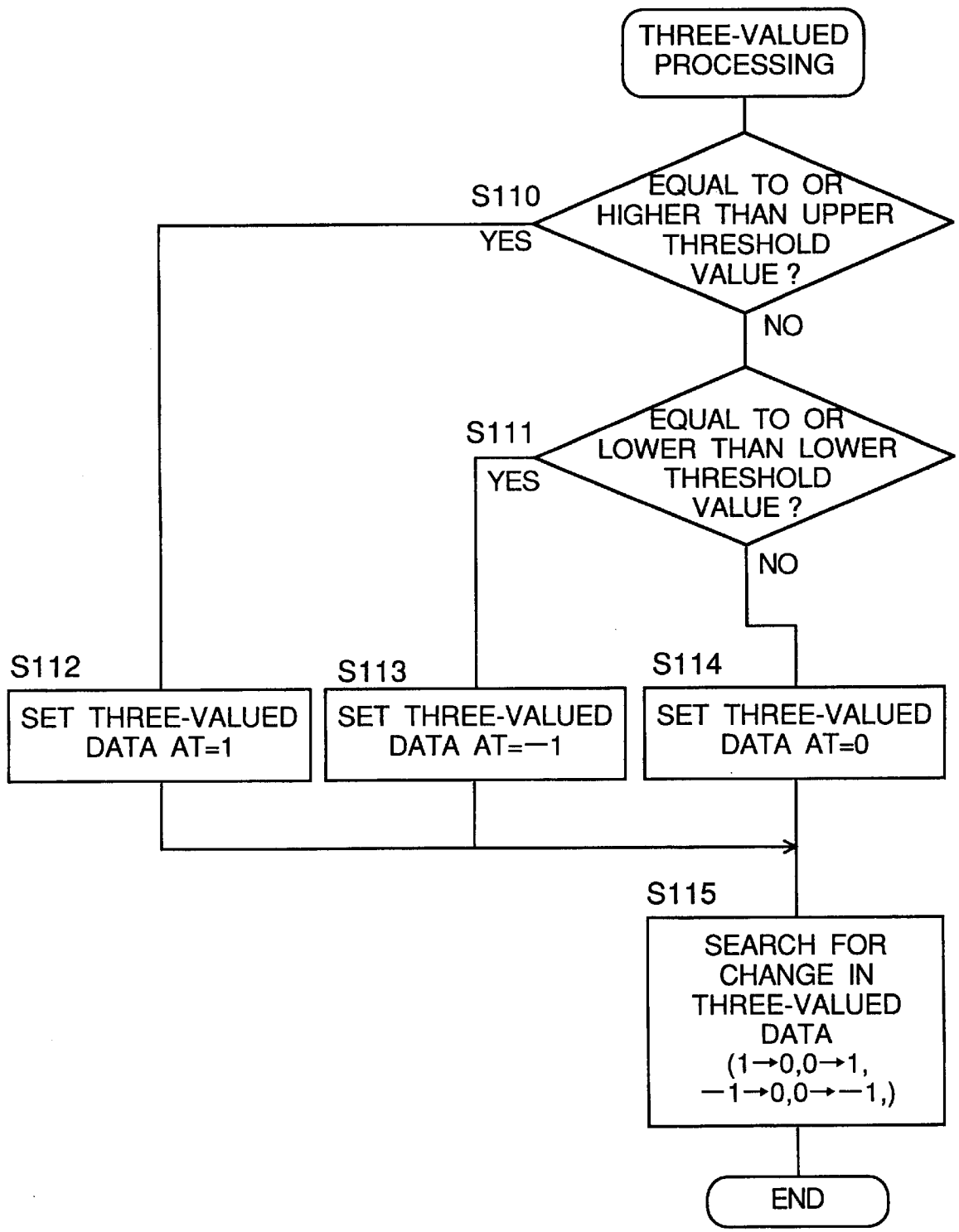
FIG. 27 is a flow chart for explaining the processes in a step S87 of FIG. 26B.

In the step S87, the processes as shown in FIG. 27 are performed on the output signal of each pyroelectric element 44 of each infrared sensor 42.

When the output of a pyroelectric element 44 is not lower than the upper threshold value in a step silo, three-valued data is set at "1" in a step S112. When the output is lower than the upper threshold value in the step S110, a step Sill is executed. When the output of the pyroelectric element 44 is not higher than the lower threshold value in the step S111, three-valued data is set at "−1" in a step S113. When the output is higher than the lower threshold value in the step S111, three-valued data is set at "0" in a step S114.

In a step S115, the change in the three-valued data is searched for, with regard to each pyroelectric element 44 of each infrared sensor 42. More specifically, for each pyroelectric element 44, the three-valued data calculated in the step S87 in the last processing is compared with the three-valued data calculated in the step S87 in the present processing, and it is thereby judged whether three-valued data has varied (from "1" to "0," from "0" to "1," from "−1" to "0," or from "0" to "−1") or not.

In the step S88, when three-valued data of any of the pyroelectric elements 44 of any of the infrared sensors 42 is "1" or "−1," it is judged that one or more human bodies have been detected, and then the step S89 is executed. In the step S88, when every output of the pyroelectric elements 44 of the infrared sensors 42 is "0," it is judged that no human bodies 8 have been detected, and then the step S90 is executed.

In the case that the flag F3 is "0" in the step S89, the flag F3 is set at "1" in the step S91 and then the operation goes back to the step S86. In the step S89, when the flag F3 is not "0," the operation goes back to the step S86 without the reset of the flag F3. On the other hand, in the case that the flag F3 is "0" in the step S90, the operation goes back to the step S82. In the step S90, when the flag F3 is not "0," the step S92 is executed.

In the case that the state without human body has continued since the actuation of the apparatus, the operation shifts from the step S88 to the step S90 and then goes back to the step S82 because the flag F3 remains at the initial value "0." After that, the processes from the step S82 to the step S90 are repeated until any human bodies are detected.

When any human bodies 8 enter the detection areas 50 of any infrared sensors 42 after the continuation of the state without human body, it is judged in the step S88 that one or more human bodies have been detected, and the step S89 is executed. In this case, the operation shifts from the step S89 to the step S91 because the flag F3 remains at the initial value "0," and the flag F3 is set at "1". After that, the operation goes back to the step S86.

Subsequently, the processes of the steps S86 to S89 are repeated as long as it is judged in the step S88 that one or more human bodies have been detected.

As mentioned above, when it is judged in the step S88 that one or more human bodies have been detected, the operation returns to the step S86 without returning to the step S82. As a result, the reference value and the upper and lower threshold values calculated in the step S87 are maintained without being updated as long as one or more human bodies 8 are detected.

When the human bodies 8 have completely passed, it is judged in the step S88 that no human bodies are detected, and the step S90 is executed. In this case, the operation shifts from the step S90 to the step S92 because the flag F3 has been set at "1."

In the step S92, the traveling direction of human body is decided.

Figure 28:
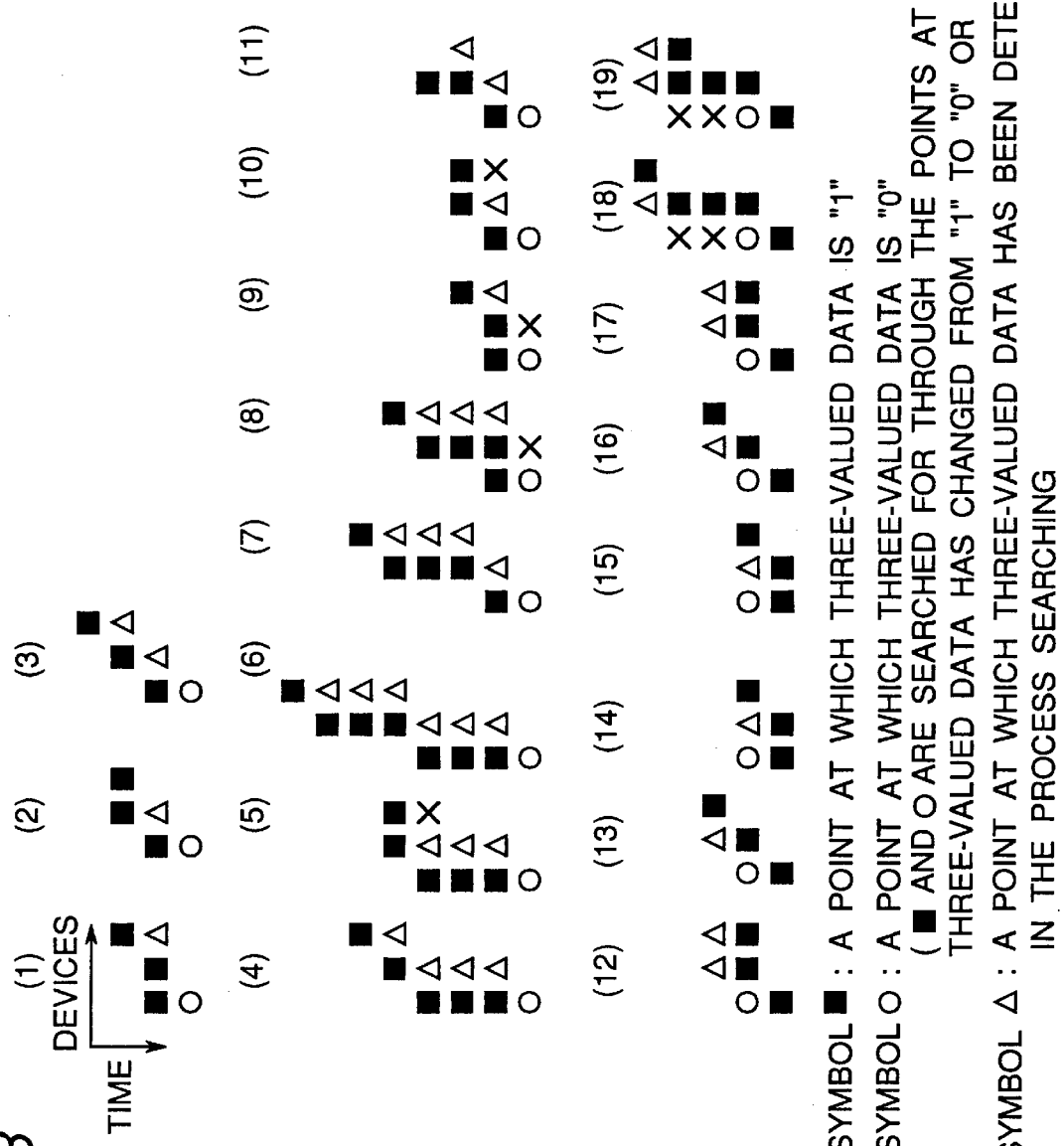
FIG. 28 is a schematic representation illustrating examples in which traveling direction can be detected in a step S92 of FIG. 26B.

FIG. 28 illustrates examples in which the traveling direction can be detected for one infrared sensor 42. In the examples (1) to (19), the horizontal direction represents the positions of pyroelectric elements 44, while the vertical direction represents the progress of time (i.e., steps in which an infrared sensor 42 chops an infrared ray incident thereon). In FIG. 28, the symbol ■ represents a point at which three-valued data is "1" or "−1". The symbol ○ represents a point at which three-valued data is "0." The points ■ and ○ are retrieved from the points at which the change in three-valued data has been detected in the step S115 of FIG. 27. In FIG. 28, the symbol ▲ represents a point at which three-valued data of "0" has been detected in the process of searching. In the case that, as shown in the examples, a point at which three-valued data is "1" or "−1"has continuously moved over not less than three pyroelectric elements 44, the traveling direction of the human body 8 can be decided. For example, the example (1) indicates that a human body has moved in the direction pointing from the device on the left side of the drawing to the device on the right side.

In the step S9, the number of passers is estimated.

Figure 29:
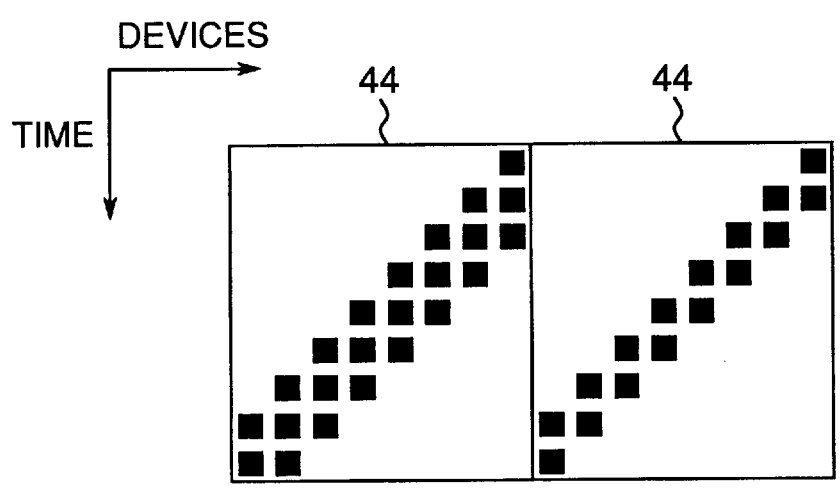
FIG. 29 is a schematic representation illustrating an example of the infrared sensor for the determination of the number of passers in a step S93 of FIG. 26.

FIG. 29 illustrates an example of the outputs of two adjoining infrared sensors 42. The horizontal direction of FIG. 29 represents the positions of pyroelectric elements 44, i.e., the positions of human bodies 8 with respect to the direction in which the passage 1 extends. The vertical direction of FIG. 29 represents steps of chopping, i.e., the progress of time. In the case that the concurrent entrance of human bodies 8 into the detection areas of two infrared sensors 42 is detected as in FIG. 29, it is judged that the number of passers is one.

In the step S95, on the other hand, the distance measuring sensors 14 are actuated. Subsequently, in the step S96, the outputs of the distance measuring sensors 14 in the state without human body are grabbed into the signal processing circuit 58 and the distances in the state without human body are thereby calculated. In the step S97, the value of a flag F4 is set at an initial value of "0."

In the step S98, the outputs of the distance measuring sensors 14 are read into the signal processing circuit 58. When the distance measuring sensors 14 are in the OFF state in the step S99, it is judged that no human bodies have passed, and the step S100 is executed. In the step S100, it is judged whether the flag F4 is 0 or not. The flag F4 remains at the initial value "0" until any human bodies 8 are detected, and the operation then goes back from the step S100 to the step S98.

When one or more human bodies 8 enter the detection areas 52 of any of the distance measuring sensors 14, it is judged in the step S99 that one or more human bodies have been detected, and the step S101 is executed. In the case that, after the continuation of a the non-detection of human body, any human bodies have been detected for the first time in the step S99 presently executed, the operation shifts from the step S101 to the step S102 because the flag F4 remains at the initial value "0" as mentioned above, and the flag F4 is set at "1". After that, the operation goes to the step S98.

When the human bodies 8 have completely passed the detection areas 52, the operation shifts from the step S100 to the step S103. In the step S103, the distance from each distance measuring sensor 14 to the human bodies 8 is measured on the basis of the output signals from each distance measuring sensor 14 read in the step S98.

In the step S104, the width of the human bodies is calculated in the same way as the third embodiment.

In the step S105, the number of passers is decided on the basis of the width of the human bodies calculated in the step S104. This estimation of the number of passers is carried out in the same way as the determination of the number of passers in the third embodiment shown in FIG. 10.

In a step S106, the means 60 for checking determination results compares the traveling direction and number of passers which have been decided on the basis of the output signals of the infrared sensors 42 in the step S92, 93 with the number of passers which has been determined on the basis of the output signals of the distance measuring sensors 14 in the step S105. When the former and latter results of determination do not coincide with each other, it is judged that the traveling direction cannot be determined or that the number of passers cannot be determined.

In a step S107, display means 61 displays the number of passers as that of those who have entered and as that of those who have left, separately.

In the ninth embodiment, as mentioned above, the traveling direction of one or more human bodies 8 is determined and the number of passers is estimated with the pyroelectric infrared sensors 42 provided on the ceiling 5 of the passage 1. Additionally, the number of passers is determined with the distance measuring sensors 14 mounted to the side walls 6, 7 of the passage. Furthermore, the number of passers determined on the basis of the output signals of the infrared sensors is compared with the number of passers determined on the basis of the output signals of the distance measuring sensors. In accordance with the arrangement of the ninth embodiment, therefore, the number and traveling direction of passing human bodies can be detected with a high accuracy and with a high degree of reliability. More specifically, in accordance with the arrangement of the ninth embodiment, the detectivity on the number of passers, which has been not more than 80% conventionally, can be increased to not less than 95%.

The above embodiments are intended to monitor the number and traveling directions of human bodies passing a specific area on a passage. However, the present invention is not limited to the embodiments described but may be applied to the monitoring of the doorway or the like of a vehicle such as train, a building such as exhibition hall, movie theater and store, or a room.

In the first to ninth embodiments, the distance measuring sensors or infrared sensors to be mounted to the ceiling of a passage are primarily mounted to one or more base bodies. However, the distance measuring sensors or infrared sensors may be disposed in one or more recesses provided on the ceiling.

As is evident from the above description, an apparatus for detecting the number of passers in accordance with the invention is capable of detecting with a high accuracy the number and traveling directions of human bodies passing an area to be monitored, and has a high reliability. With the use of the apparatus for detecting the number of passers of the present invention, accordingly, the detection and judgment can be performed for the human bodies entering and leaving a vehicle such as train, a building, a room or the like. Thus, with the use of the apparatus of the invention the accurate number of visitors, ratio of the number of passengers or visitors to capacity, or the like can be detected. Consequently, the apparatus of the invention will contribute greatly, particularly to the realization of a comfortable intelligent building system.

In the arrangement in which the traveling direction of one or more human bodies is detected with sensors for measuring variation in distance or distance measuring sensors, the manufacturing cost or the like of such a sensor is relatively low and the detectivity of such a sensor is relatively high, because the distance measuring sensor comprising a light emitter and a light receiver is small in size.

In accordance with the arrangement in which a plurality of sensors for measuring variation in distance or distance measuring sensors are integrated together, the apparatus can be made small in size.

In accordance with the arrangement in which a plurality of sensors for measuring variation in distance or distance measuring sensors are sequentially actuated one at a time, the number of passers can be detected with a high accuracy and with a high degree of reliability, because the radiation, which is emitted by such adjoining sensors and is then reflected, is prevented from being received by other sensors.

In accordance with the arrangement comprising distance measuring sensors and infrared sensors, the number of passers can be detected with a higher accuracy and with a high degree of reliability by the comparison between the number and traveling direction of passers which have been determined on the basis of the output signals of the infrared sensors and the number of passers which has been determined on the basis of the output signals of the distance measuring sensors.

What is claimed is:

1. An apparatus for detecting a human body passing a specific area to be monitored including a ceiling and a floor, and for determining a number of human bodies passing the specific area, said apparatus comprising:

a plurality of distance variation measuring sensors provided in a plurality of rows and to be positioned on the ceiling of the specific area to be monitored, wherein each distance variation measuring sensor includes a light emitter, a light receiver, a focus, and a detection area, and is operable for detecting the human body and for measuring a rate of change relative to time in distance between said each distance variation measuring sensor and the human body; and judging means for determining the number of human bodies passing the specific area on the basis of a number of sensors which have detected any human body in each row of sensors and for determining a traveling direction of the human body by comparing a rate of change relative to time in distance measured by one of said plurality of sensors in one of said rows with a rate of change relative to time in distance measured by another of said plurality of sensors in another of said rows;

wherein the detection area of each sensor extends from said each sensor to a height to be set so as to correspond to the floor of the specific area to be monitored and the focus of each sensor is at a distance from said each sensor to be set so as to correspond to a distance between said each sensor and a height between shoulder height and head height of an average adult person.

2. An apparatus as claimed in claim 1, wherein said distance variation measuring sensors are located at intervals along said plurality of rows, said intervals are not less than 20 cm and not more than 40 cm.

3. An apparatus as claimed in claim 2, wherein said apparatus is operable for actuating said plurality of distance variation measuring sensors sequentially in a predetermined order and at predetermined time intervals.

4. An apparatus as claimed in claim 1, wherein the detection areas of sensors in at least one of said rows are oriented at an angle with respect to a vertical direction and the detection areas of said sensors in each row differ in orientation with respect to the vertical direction from said sensors in each other row.

5. An apparatus as claimed in claim 4, further comprising a base body, wherein said plurality of distance variation measuring sensors are mounted to said base body.

6. An apparatus as claimed in claim 5, wherein said apparatus is operable for actuating said plurality of distance variation measuring sensors sequentially in a predetermined order and at predetermined time intervals.

7. An apparatus as claimed in claim 4, wherein said apparatus is operable for actuating said plurality of distance variation measuring sensors sequentially in a predetermined order and at predetermined time intervals.

8. An apparatus as claimed in claim 1, wherein said apparatus is operable for actuating said plurality of distance variation measuring sensors sequentially in a predetermined order and at predetermined time intervals.

9. An apparatus for detecting a human body passing a specific area to be monitored including opposing side walls, and for determining a number of human bodies passing the specific area, said apparatus comprising:

a plurality of pairs of distance measuring sensors to be provided on the opposing side walls of the specific area to be monitored, wherein each distance measuring sensor includes a light emitter and a light receiver, and is operable for detecting a distance between said each distance measuring sensor and the human body; and judging means for determining the number of human bodies passing the specific area on the basis of the distances measured by said distance measuring sensors and for determining a traveling direction of the human body on the basis of a chronological order of detection of the human body by said distance measuring sensors;

wherein each pair of sensors includes an opposing sensor on each opposing wall which form a line of detection therebetween such that at least two of the lines formed by said plurality of pairs of sensors are spaced apart vertically and at least two of the lines formed by said plurality of sensors are spaced apart in a direction in which the human body passes.

10. An apparatus for detecting a human body passing a specific area to be monitored including a ceiling, and for determining a number of human bodies passing the specific area, said apparatus comprising:

a plurality of distance measuring sensors to be provided in one given location on the ceiling of the specific area to be monitored, wherein each distance measuring sensor includes a light emitter, a light receiver, and a detection area, and is operable for detecting the human body and for detecting a distance between said each distance measuring sensor and the human body; and judging means for determining the number of human bodies passing the specific area on the basis of a number of sensors which have detected any human body and for determining a traveling direction of the human body on the basis of the distance measured by said distance measuring sensors;

wherein said sensors are oriented such that the detection area of each sensor extends downward at an angle with respect to a horizontal direction and such that the detection areas of said plurality of sensors are each oriented at a different angle with respect to a direction in which the human body passes such that the detection areas of said plurality of sensors form a sector spread along an orthogonal direction with respect to the direction in which the human body passes.

11. An apparatus as claimed in claim 10, further comprising a base body, wherein said plurality of distance variation measuring sensors are mounted to said base body.

12. An apparatus as claimed in claim 11, further comprising driving means for rotating said base body reciprocally and continuously about a vertical axis.

13. An apparatus as claimed in claim 12, wherein the detection area of each sensor, at a height corresponding to a height between shoulder height and head height of an average adult person, has a width which is not more than 40 cm.

14. An apparatus as claimed in claim 12, wherein said judging means is operable for judging that one or more human bodies have passed when two or more distance measuring sensors have detected a human body.

15. An apparatus as claimed in claim 12, wherein said apparatus is operable for actuating said plurality of distance measuring sensors sequentially in a predetermined order and at predetermined time intervals.

16. An apparatus as claimed in claim 11, wherein the detection area of each sensor, at a height corresponding to a height between shoulder height and head height of an average adult person, has a width which is not more than 40 cm.

17. An apparatus as claimed in claim 11, wherein said judging means is operable for judging that one or more human bodies have passed when two or more distance measuring sensors have detected a human body.

18. An apparatus as claimed in claim 11, wherein said apparatus is operable for actuating said plurality of distance measuring sensors sequentially in a predetermined order and at predetermined time intervals.

19. An apparatus as claimed in claim 10, wherein the detection area of each sensor, at a height corresponding to a height between shoulder height and head height of an average adult person, has a width which is not more than 40 cm.

20. An apparatus as claimed in claim 10, wherein said judging means is operable for judging that one or more human bodies have passed when two or more distance measuring sensors have detected a human body.

21. An apparatus as claimed in claim 10, wherein said apparatus is operable for actuating said plurality of distance measuring sensors sequentially in a predetermined order and at predetermined time intervals.

22. An apparatus for detecting a human body passing a specific area to be monitored including a ceiling and opposing side walls, and for determining a number of human bodies passing the specific area, said apparatus comprising:

a plurality of infrared sensors to be mounted to the ceiling of the specific area to be monitored and to be disposed along an orthogonal direction with respect to a traveling direction of the human body through the specific area to be monitored, said plurality of infrared sensors each including a plurality of elements for detecting infrared radiation, wherein each infrared sensor is to be mounted such that said elements of said each infrared sensor are disposed along the traveling direction of the human body through the area to be monitored;

a pair of distance measuring sensors to be provided on the opposing side walls of the specific area to be monitored, wherein each distance measuring sensor includes a light emitter and a light receiver, and is operable for detecting a distance between said each distance measuring sensor and the human body; and judging means for determining the number of human bodies passing the specific area on the basis of the distances measured by said distance measuring sensors and for determining a traveling direction of the human body on the basis of a chronological order of detection of the human body by said elements in each infrared sensor.

23. An apparatus as claimed in claim 22, wherein the detection area of each sensor, at a height corresponding to a height between shoulder height and head height of an average adult person, has a width which is not more than 40 cm and the spacing between the detection areas of said sensors, at a height corresponding to a height between shoulder height and head height of an average adult person, is not more than 40 cm.

24. An apparatus as claimed in claim 23, further comprising:

means for calculating a reference value by averaging outputs of said infrared sensors in a state without a presence of any human body and for calculating upper and lower threshold values deviating from the reference value by a predetermined amount; and means for determining that one or more human bodies have been detected when an output of one or more of said elements of said infrared sensors is not lower than the upper threshold value or not higher than the lower threshold value.

25. An apparatus as claimed in claim 22, further comprising:

means for calculating a reference value by averaging outputs of said infrared sensors in a state without a presence of any human body and for calculating upper and lower threshold values deviating from the reference value by a predetermined amount; and means for determining that one or more human bodies have been detected when an output of one or more of said elements of said infrared sensors is not lower than the upper threshold value or not higher than the lower threshold value.

26. An apparatus as claimed in claim 25, wherein said means for determining is operable for holding the reference value and the upper and lower threshold values when one or more human bodies are detected, and for updating the reference value and the upper and lower threshold values when no human bodies are detected.

27. An apparatus as claimed in claim 26, wherein said means for determining is operable for detecting the traveling direction of the human body when a location of an element which has detected the human body has shifted continuously over three elements.

\* \* \* \* \*